(12) United States Patent
Sugimoto

(10) Patent No.: US 7,564,590 B2
(45) Date of Patent: Jul. 21, 2009

(54) IMAGE PROCESSING APPARATUS AND METHOD

(75) Inventor: Noriko Sugimoto, Konan (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 145 days.

(21) Appl. No.: 11/476,575

(22) Filed: Jun. 29, 2006

(65) Prior Publication Data

US 2007/0008563 A1 Jan. 11, 2007

(30) Foreign Application Priority Data

Jun. 30, 2005 (JP) ............................. 2005-192340
Jun. 30, 2005 (JP) ............................. 2005-192341

(51) Int. Cl.
*H04N 1/40* (2006.01)
*H04N 1/405* (2006.01)
*G06K 15/00* (2006.01)
*G06K 1/00* (2006.01)
*G06K 9/00* (2006.01)
*G06F 15/00* (2006.01)
*G09G 5/00* (2006.01)

(52) U.S. Cl. ...................... 358/3.03; 358/1.9; 382/252; 345/616

(58) Field of Classification Search .................. 358/1.9, 358/3.03; 382/252; 345/616
See application file for complete search history.

(56) References Cited

U.S. PATENT DOCUMENTS

| 5,271,070 | A | 12/1993 | Truong et al. |
| 5,481,293 | A | 1/1996 | Kanno |
| 6,768,559 | B1 * | 7/2004 | Kuwata et al. ............... 358/1.9 |
| 7,196,821 | B2 * | 3/2007 | Kakutani .................... 358/3.03 |

FOREIGN PATENT DOCUMENTS

JP  6-284291 A  10/1994

* cited by examiner

*Primary Examiner*—Mark K Zimmerman
*Assistant Examiner*—Fan Zhang
(74) *Attorney, Agent, or Firm*—McDermott Will & Emery LLP

(57) ABSTRACT

An image processing method and apparatus is provided that executes conversion processing of image data according to an error diffusion method. A unit processing for one pixel of the original image and another unit processing for an interpolate pixel that is inserted between lines of pixels of the original image are executed in the line direction. The processings for one line are sequentially repeated for each line of the original image. A calculating portion, for calculating an average error value which is an average of error values of a plurality of neighboring pixels, is utilized for converting a pixel value of a target pixel. A plurality of multiplying sections and addition memory sections are provided in correspondence with the alignment of a plurality of previous-line-neighboring pixels in a previous line located ahead of a pixel line in which the target pixel exists.

18 Claims, 13 Drawing Sheets

FIG.3

WEIGHTING COEFFICIENTS

| [2(m-1),n-2]<br>[2m-1,n-4]<br><br>Ka=1/16<br>(1/16) | [2(m-1),n-1]<br>[2m-1,n-3]<br><br>Kb=1/16<br>(2/16) | [2(m-1),n]<br>[2m-1,n-2]<br><br>Kc=4/16<br>(4/16) | [2(m-1),n+1]<br>[2m-1,n-1]<br><br>Kd=1/16<br>(2/16) | FORWARDMOST PIXEL<br>[2(m-1),n+2]<br>[2m-1,n]<br><br>Ke=1/16<br>(1/16) |
|---|---|---|---|---|
| [2m-1,n-2]<br>[2m,n-4]<br><br>Kf=4/16<br>(2/16) | [2m-1,n-1]<br>[2m,n-3]<br><br>Kg=4/16<br>(4/16) | TARGET PIXEL<br>[2m-1,n]<br>[2m,n-2] | | |

IMAGE PROCESSING APPARATUS AND METHOD

This application is based on Japanese Patent Application Nos. 2005-192340 and 2005-192341 both filed on Jun. 30, 2005, the contents of which are incorporated herein by reference.

BACKGROUND OF THE INVENTION

1. Field of the Invention

The present invention relates in general to an image processing apparatus and method for converting image data by image processing according to the error diffusion method.

2. Discussion of Related Art

The error diffusion method is a technique used in converting image data of an image read by a scanner or the like into image data for reproducing the image by a printer or the like. The method is applicable to conversion of original image data composed of pixel values represented as gradation into conversion image data composed of multilevel pixel values (including binary pixel values). The method is widely known as a technique capable of reproducing good halftone images. The image processing according to the error diffusion method is disclosed in JP-A-6-284291, for instance.

SUMMARY OF THE INVENTION

In accordance with an increase in a speed and accuracy of operations of an image reading apparatus, image forming apparatus, etc., it is desired that data conversion processing be executed at a higher speed with a smaller load. Further, in accordance with a reduction in cost of electronic equipment, a low-cost device for executing the conversion processing is desired. The above-indicated facts are true of image processing according to the above-indicated error diffusion method and an apparatus for executing the image processing, and various improvements in the image processing and the image processing apparatus leads to enhancement of the utility of the processing and the apparatus. In view of the above, it is an object of the present invention to provide an image processing apparatus and method with high utility.

To achieve the above-indicated object, an image processing apparatus and method according to a first aspect of the present invention are for executing image processing according to the error diffusion method, in detail, conversion processing of image data. In the conversion processing, a unit processing is executed for one pixel of an original image. In correspondence with the one pixel, one pixel is inserted between adjacent two lines composed of pixels of the original image and a unit processing is executed for the inserted one pixel. These processings are repeated in a line direction and the processings for one line are sequentially repeated for each line of the original image. According to the image processing, image data of the original image can be easily converted into image data in which lines of pixels are inserted. Therefore, the image processing apparatus and method of executing the image processing have high utility.

To achieve the above-indicated object, an image processing apparatus according to a second aspect of the present invention is for executing image processing according to the error diffusion method, in detail, conversion processing of image data. In the image processing apparatus, a calculating portion for calculating an average error value which is utilized for converting a pixel value of a target pixel and which is an average of error values of a plurality of neighboring pixels that are set in the neighborhood of the target pixel is constituted by including a plurality of multiplying sections and a plurality of addition memory sections which are virtually provided in correspondence with the alignment of a plurality of previous-line-neighboring pixels on a previous line that is located ahead of a pixel line in which the target pixel exists. Each multiplying section is arranged to multiply: (a) an error value of a forwardmost one of the previous-line-neighboring pixels as seen in a direction in which the conversion processing proceeds; and (b) a corresponding one of weighting coefficients which are set for the respective previous-line-neighboring pixels. Each addition memory section is arranged to execute an operation of adding a memory value of one of the addition memory sections located behind itself and a multiplied value obtained by one of the multiplying sections that corresponds to itself and storing an added value as the memory value. The operation of the addition memory sections is arranged to be sequentially executed in order from the forwardmost one of the addition memory sections to the rearmost one of the addition memory sections, whereby the average error value of the plurality of neighboring pixels is calculated based on the memory value of the forwardmost one of the addition memory sections. In a conventional image processing apparatus, the error value of each of the previous-line-neighboring pixels is multiplied by the corresponding one of the weighting coefficients set for the respective previous-line-neighboring pixels, in each operation for each target pixel, and the obtained multiplied values are summed up for thereby calculating the average error value. In contrast, the image processing apparatus according to the second aspect of the present invention constructed as described above is arranged to add cumulatively the multiplied values. Therefore, it is possible to reduce the number of clocks necessary for calculating the average error value and simplify the circuitry structure. As a result, the present image processing apparatus has high utility.

FORMS OF INVENTION

There will be described in detail various forms of an invention which is considered claimable (hereinafter may be referred to as "claimable invention"). Each of the forms of the invention is numbered like the appended claims and depends from the other form or forms, where appropriate, for easier understanding of the claimable invention. It is to be understood that the invention is not limited to the technical features or any combinations thereof which will be described, and shall be construed in the light of the following descriptions of the various forms and preferred embodiments of the invention. It is to be further understood that a plurality of elements or features included in any one of the following forms of the invention are not necessarily provided all together, and that any form in which one or more elements or one or more features is/are added to any one of the following forms and any form in which one or more elements or one or more features is/are deleted from any one of the following forms may be considered claimable.

The forms (1) and (2) indicated below are not forms of the claimable invention, but list constituent elements on which the claimable invention is based. Any of the forms (11)-(51) which recite either (1) or (2) are forms of the claimable invention.

(1) An image processing apparatus used for converting image data of an original image composed of a plurality of pixels defined as a matrix into image data of a converted image, by a processing according to an error diffusion method, wherein a pixel value of each of the plurality of pixels that constitute the image data of the original image is defined as an original pixel value, a pixel value of each of the plurality of pixels that constitute the image data of the converted image is defined as a converted pixel value, and a processing for one pixel according to the error diffusion method is defined as a unit processing, wherein the image processing apparatus comprises a unit-processing executing portion which executes the unit processing for a target pixel as one pixel existing on a subject line that is one of lines of the pixels in the matrix and which obtains the converted pixel value and the error value of the target pixel, based on the original pixel value of the target pixel, and wherein the image processing apparatus is arranged to perform a line processing in which the unit processing by the unit-processing executing portion is repeated for the subject line while the target pixel is sequentially shifted forward in a line direction and the image processing apparatus is arranged such that the line processing is repeated while the subject line is sequentially shifted, whereby the image data of the original image is converted into the image data of the converted image.

As explained above, the above form is a basis of the claimable invention. In "a processing according to an error diffusion method" recited in this form, its concrete technique is not particularly limited. The "unit processing" as a series of processing may be executed for every "target pixel" (referred also to as "focus pixel" or "subject pixel") as one pixel of the original image. As the unit processing, it may be possible to employ the following processing, for instance: The pixel value of the target pixel is corrected on the basis of an average error obtained by averaging errors of pixels which exist in the vicinity of the target pixel and on which the unit processing has been executed, the errors arising from a process of obtaining the multilevel pixel value (including a binarize process). The corrected pixel value is compared with a threshold set for obtaining the multilevel pixel value, whereby "the converted pixel value" as the multilevel pixel value of the target pixel is determined. Further, on the basis of the converted pixel value and the corrected pixel value, "the error value" of the target pixel is calculated. The unit processing is repeated as described above, so that "the image data of the original image" (hereinafter referred to as "the original image data") as the image data before conversion is converted into "the image data of the converted image" (hereinafter referred to as "the converted mage data") as the image data after conversion.

In the present form, "the original pixel value" may be a value determined based on an optical characteristic of each pixel read by a scanner, a digital camera, or the like and may indicate, as gradation, the characteristic of the pixel such as concentration. The original pixel values may be discrete values ranging from 0 to 255 or continuous values, for instance. Further, the original pixel values may be values having undergone filtering such as smoothing, edge enhancement, or the like. Meanwhile, "the converted pixel value" is a converted value of the original pixel value by the unit processing and may be a multilevel value such as a binary value, a ternary value, or a value larger than the ternary value. "The line direction" is defined as follows: Where each of the original image and the converted image is considered to be composed of pixels arranged in a matrix in mutually intersecting two directions, the line direction corresponds to one of the two directions. That is, where the matrix is defined as columns and lines, the line direction corresponds to a direction in which the pixels are arranged and which constitutes one of the columns and lines. In the present form, the image processing is performed such that the pixels are scanned in the line direction and also in a direction intersecting the line direction while completing the scanning in the line direction. Accordingly, the line direction may be referred to as a main scanning direction and the direction intersecting the line direction (hereinafter may be referred to as "a column direction") may be referred to as a sub scanning direction. It is noted that "forward or front" in each of the line direction and the column direction means a direction in which the unit processing and the line processing proceed while "rearward or behind" means a direction opposite to the direction of proceeding of the unit processing and the line processing.

The image processing according to this form may be executed in converting formed original image data into the converted image data. Namely, the image processing may be executed for converting filed original data into the converted image data in a batch-processing manner, for instance. Alternatively, the image processing may be executed in sequentially converting the original image data that is being formed, into the converted image data. Namely, in a process of forming the original image data while being read by a scanner or the like, for instance, each time when image data for a part of pixel lines in the original image data is formed, that image data may be sequentially converted, that is, the image processing may be executed in parallel with the reading by the line scanner or the like. (Such image processing may be hereinafter referred to as "sequential processing".) In the sequential processing, a direction corresponding to a direction in which light-receiving elements of the scanner are arranged may be made as a main scanning direction while a direction corresponding to a moving direction of a scanning head may be made as a sub scanning direction.

In a hardware aspect, the image processing apparatus according to the above form may be constituted as an exclusive electronic circuit or electric circuit, or may be constituted principally by a computer. Where the image processing apparatus is constituted principally by a computer, the apparatus may be configured to realize the above-described image processing by execution of exclusive image processing programs by the computer.

(2) The image processing apparatus according to the above form (1), wherein a plurality of pixels which are set in the matrix in the vicinity of the target pixel and whose error values are utilized for obtaining the converted pixel value of the target pixel are defined as a plurality of error-utilizing pixels, wherein the unit-processing executing portion includes an average-error-value calculating portion which calculates an average error value of the plurality of error-utilizing pixels, on the basis of the error values of each of a plurality of error-utilizing pixels on a previous line which are continuous to each other on the subject line in a previous line processing and which are at least a part of the plurality of error-utilizing pixels, and wherein the unit-processing executing portion is configured to correct the original pixel value of the target pixel based on the average error value calculated by the average-error-value calculating portion and to obtain the converted pixel value of the target pixel based on the pixel value obtained by the correction.

In the image processing according to the error diffusion method, there is utilized, in determining the converted pixel value of the target pixel, an average error value obtained by averaging error values of pixels which are located in the vicinity of the target pixel and on which the unit processing has been already executed. The image processing apparatus according to this form is equipped with a functional portion for calculating the average error value. The above-indicated "error-utilizing pixels" are not limited to only the "error-utilizing pixels on a previous line", that is, a plurality of pixels on a line of pixels on which the line processing has been executed (hereinafter may be referred to as "previous line"). As explained below, for instance, the error-utilizing pixels may also include at least one pixel on a line of pixels on which the line processing is currently executed (hereinafter may be referred to as "current line"). Further, the error-utilizing pixels may also include at least one pixel on at least one line of pixels on which the line processing has been executed before execution of the line processing on the previous line. It is noted that the "average error value" stated in this form means an average value which is obtained by performing weighting on the error value of each of the error-utilizing pixels. As the weighting, there may be employed suitable one depending upon the structure of the above-indicated error-utilizing pixels. In this connection, where the weighting is made uniform for the error-utilizing pixels, it is possible to make the average error value as a simply averaged one.

(11) The image processing apparatus according to the above form (2), wherein a pixel located forwardmost in the line direction among the plurality of error-utilizing pixels on the previous line is defined as a forwadmost error-utilizing pixel on the previous line, wherein the average-error-value calculating portion includes: a plurality of previous-line multiplying sections which are virtually disposed in the line direction and each of which executes multiplication processing of an error value of the forwardmost error-utilizing pixel on the previous line and a corresponding one of weighting coefficients that are respectively set in correspondence with the plurality of error-utilizing pixels on the previous line, a number of the plurality of previous-line multiplying sections corresponding to a number of the plurality of error-utilizing pixels on the previous line; and a plurality of previous-line addition memory sections which are provided so as to respectively correspond to the plurality of previous-line multiplying sections and whose number corresponds to a number of the plurality of error-utilizing pixels on the previous line, a rearmost one of the plurality of previous-line addition memory sections in the line direction being configured to store a multiplied value obtained after the multiplication processing executed by one of the plurality of multiplying sections that corresponds to itself while each of the rest of the plurality of previous-line addition memory sections being configured to add a memory value of one of the plurality of previous-line addition memory sections that is located immediately behind itself and a multiplied value obtained after the multiplication processing executed by one of the plurality of multiplying sections that corresponds to itself and to store an added value obtained by the addition processing, and wherein the average-error-value calculating portion is configured such that the processing of each of the plurality of previous-line addition memory sections is sequentially executed in order from a forwardmost one of the plurality of previous-line addition memory sections in the line direction and such that the average error value is calculated based on a memory value of the forwardmost one of the plurality of previous-line addition memory sections.

The above-indicated form intends to improve the calculating processing of the average error value. In the conventional image processing apparatus, each time when the unit processing is executed for the target pixel, the error value of each of the error-utilizing pixels on the previous line and a corresponding one of weighting coefficients that are set for the respective error-utilizing pixels are multiplied together, and the multiplied values are summed up, whereby at least a part of the average error value is calculated. Accordingly, where the image processing apparatus is constituted principally by the electronic circuit or the electric circuit, the multiplied values in each of which the error value and the weighting coefficient are multiplied need to be temporarily stored for each unit processing and the stored values need to be sequentially added up. Therefore, in addition to a plurality of registers for storing the results of the multiplication, there are needed registers for the addition. In consequence, the circuit structure becomes complicated, and the number of clocks for calculating the average error value needs to be made equal to or larger than the number of the error-utilizing pixels on the previous line, undesirably increasing the processing time. In contrast, the image processing apparatus according to this form may have the register structure arranged to accumulatively add, in accordance with the progress of the unit processing, the multiplied value of the error value of one of the error-utilizing pixels on the previous line and a corresponding one of the weighting coefficients that are set in the same number as the error-utilizing pixels on the previous line. Therefore, the number of registers can be reduced and the circuit structure can be simplified. Further, the number of clocks required for calculating the average error value can be made one, in an extreme case.

To be "virtually disposed in the line direction" described in this form does not mean that the above-indicated previous-line multiplying sections are actually disposed in the line direction, but means that those previous-line multiplying sections correspond to the alignment of the error-utilizing pixels on the previous line. The concept is introduced for the sake of convenience in order to stipulate the correspondence between the multiplying sections and the weighting coefficients that are set for the respective error-utilizing pixels on the previous line and the correspondence that determines a pattern of adding the result values of the multiplication processing by the multiplying sections and the memory values of the previous-line addition-memory sections, and a pattern of storing the added value in the previous-line addition memory sections. In the correspondence of this form, the result value of the multiplication processing by each of the previous-line multiplying sections is added up, with the progress of the unit processing, from the rear toward the front in the direction in which the multiplying sections are virtually disposed, that is, toward the same direction as the direction in which the target pixel is shifted.

(12) The image processing apparatus according to the above form (11), wherein the average-error-value calculating portion is configured to calculate the average error value, further on the basis of an error value of each of at least one error-value utilizing pixel on a current line each of which is continuous to each other on the subject line behind the target pixel in the line direction and which is a part of the plurality of error-utilizing pixels.

(13) The image processing apparatus according to the above form (12), wherein the average-error-value calculating portion includes: at least one current-line multiplying section which is virtually disposed in the line direction and each of which executes multiplication processing of an error value of a pixel located immediately behind the target pixel and a corresponding one of weighting coefficients each being set in correspondence with each of the at least one error-utilizing pixel on the current line, a number of the at least one current-line multiplying section corresponding to a number of the at least one error-utilizing pixel on the current line; and at least one current-line addition memory section each of which is provided so as to correspond to each of the at least one current-line multiplying section and whose number corresponds to a number of the at least one error-utilizing pixel on the current line, a rearmost one of the at least one current-line addition memory section in the line direction being configured to store a multiplied value obtained after the multiplication processing executed by one of the at least one multiplying section that corresponds to itself while each of the rest of the at least one current-line addition memory section being configured to add a memory value of one of the at least one current-line addition memory section that is located immediately behind itself and a multiplied value obtained after the multiplication processing executed by one of the at least one multiplying section that corresponds to itself and to store an added value obtained by the addition processing, wherein the average-error-value calculating portion is configured such that the processing of each of the at least one current-line addition memory section is sequentially executed in order from a forwardmost one of the at least one current-line addition memory section in the line direction and such that the average error value is calculated based on a memory value of the forwardmost one of the at least one current-line addition memory section.

In the above-indicated two forms, the error-utilizing pixels are set also on a current line which is a line of pixels on which the line processing is currently executed. The latter of those two forms is arranged to execute, also on the error-utilizing pixels on the current line, a processing similar to the calculating processing in the above-indicated error-utilizing pixels on the previous line. Thus, the latter form enjoys, for the processing on the error-utilizing pixels on the current line, merits similar to those obtained in the above-indicated calculating processing.

(14) The image processing apparatus according to the above form (13), wherein the average-error-value calculating portion is configured to calculate, as the average error value, a sum of the forwardmost one of the plurality of previous-line addition memory sections and the memory value of the forwardmost one of the at least one current-line addition memory section.

The above form is effective in a case in which the error-utilizing pixels are constituted by only the error-utilizing pixels on the previous line and the error-utilizing pixels on the current line.

(15) The image processing apparatus according to any one of the above forms (1)-(14), wherein an error value of one pixel that is to become the forwardmost error-utilizing pixel on the previous line is inputted each time when the unit processing is executed by the unit-processing executing portion.

In the conventional image processing apparatus explained above, the error value of each of the error-utilizing pixels on the previous line and a corresponding one of the weighting coefficients are multiplied for each unit processing on the target pixel. Therefore, where the error value of a pixel on the previous line which has been subjected to the unit processing is inputted from the exterior of the image processing apparatus, the error values of the plurality of pixels need to be inputted, complicating the input operation and hindering improvement in the speed of the image processing. In contrast, in the above form wherein only the error value of the forwardmost one of the error-utilizing pixels on the previous line is multiplied by the weighting coefficients, only the error value of the forwardmost pixel may be inputted for each unit processing. This form is made in view of the above and makes it possible to simplify the input operation of the error value, thereby allowing speedy image processing.

(16) The image processing apparatus according to the above form (15), wherein the error value of the target pixel is outputted each time when the unit processing is executed by the unit-processing executing portion.

The error value of a pixel which has undergone the unit processing is used as the error value of an error-utilizing pixel on the previous line in the next line processing. This form is made in view of the above and arranged to output the error value of the target pixel for each unit processing. Where the error value is stored in a memory disposed outside the image processing apparatus, the error value of one pixel is inputted for each unit processing and the error value of one pixel is outputted, in this form. Accordingly, the input and output operation of the error value is simplified.

(21) The image processing apparatus according to the above form (1), wherein the image processing apparatus is used for converting, while inserting pixels between any adjacent two lines in a matrix of the original image as the matrix, the image data of the original image into the image data of the converted image composed of a plurality of pixels defined as another matrix in which the matrix of the original image has been interpolated by lines of pixels, wherein each of lines of the pixels in the matrix of the pixels of the original image, said each of the lines also existing in the matrix of the pixels of the converted image, is defined as an original line while each of lines of the pixels for interpolating the matrix of the pixels of the original image in correspondence with the original line is defined as an interpolate line, wherein the image processing apparatus comprises: a first unit-processing executing portion as the unit-processing executing portion which sets one original line as the subject line while setting, as the target pixel, a first target pixel that is one pixel existing on the subject line, the first unit-processing executing portion executing the unit processing for the first target pixel and obtaining the converted pixel value and the error value of the first target pixel on the basis of the original pixel value of the first target pixel; and a second unit-processing executing portion which sets the original pixel value of a processing-undergone first target pixel that has been made as the first target pixel in one unit processing executed by the first unit-processing executing portion, as an original pixel value of a second target pixel that is correlated, on the interpolate line corresponding to the subject line, with the first target pixel, the second unit-processing executing portion executing, while utilizing the error value of the first target pixel obtained by the first unit-processing-executing portion, the unit processing for the second target pixel based on the original pixel value of the processing-undergone first target pixel and obtaining the converted pixel value of the second target pixel, and wherein the image processing apparatus is arranged to perform the line processing in which the unit processing by the first unit-processing executing portion and the unit processing by the second unit-processing executing portion are repeated respectively for the subject line and the interpolate line while the first target pixel and the second target pixel are sequentially shifted forward in the line direction.

Where the converted image in which lines of pixels are inserted in the above-indicated sub scanning direction is conventionally formed, there is initially formed another original image (hereinafter may be referred to as "interpolated original image") in which a line of pixels is inserted between any adjacent two lines in the original image. The formed interpolated image is then subjected to the image processing according to the error diffusion method, whereby the converted image is formed. Such a conventional processing needs a memory with large capacity for storing the interpolated original image when executing a batch-like processing, for instance. Further, in executing the above-mentioned sequential processing that is executed in parallel with the reading of the image data by the line scanner or the like, it is needed to get access to the pixel values for a plurality of pixel lines for each filtering on one pixel where the above-mentioned filtering such as smoothing is performed for the original image, for instance. As such, the image processing apparatus may suffer from a large load of executing the processing of forming the interpolated original image while performing the filtering and accordingly takes a long time for the processing, rendering speedy image processing difficult. The above-indicted form is made in view of the above and intends to easily form the converted image in which the lines are inserted in the sub scanning direction.

In short, the image processing apparatus according to this form has two unit-processing executing portions for executing the aforementioned unit processing. The first unit-processing executing portion as one of the two unit-processing executing portions is arranged to execute the unit processing on one pixel existing on the subject line in the original image while the second unit-processing executing portion as the other of the two unit-processing executing portions is arranged to regard the original pixel value in the processing by the first unit-processing executing portion as the original pixel value of one pixel on the interpolate line and execute the unit processing on that one pixel. Accordingly, owing to execution of a series of unit processings by the two unit-processing executing portions, there are obtained the converted pixel value for one pixel on the subject line and the converted pixel value for one pixel on the interpolate line. Therefore, the image processing apparatus according to this form permits easy image processing according to the error diffusion method while performing line interpolation.

The "processing-undergone first target pixel" described in this form may be a pixel which is made as a target in the current unit processing by the first unit-processing executing portion or a pixel which has been made as a target in the unit processing previously executed. In the former case, the original pixel values of two pixels in the same column, i.e., two pixels located in the same position in the alignment of pixels in the line direction, are converted into the converted pixel values. In the latter case, the target pixel on the interpolate line is a pixel that is located behind the target pixel on the subject line in the line direction. Namely, the original pixel value of the pixel on the interpolate line is converted with delay, with respect to the pixel value of the pixel on the subject line.

This form is expressed such that an interpolate line is inserted between lines of pixels. This form, however, does not exclude an arrangement of inserting at least two interpolate lines between lines of pixels. Namely, this form is applicable not only to a case in which the original image data with the pixel number in the line direction as the main scanning direction (corresponding to the number of columns) of 600 pixels and the pixel number in the column direction as the sub scanning direction (corresponding to the number of lines) of 300 pixels, i.e., the original image data of 600×300, is converted into the converted image data of 600×600, but also to a case in which the original image data of 600×300 is converted into the converted image data of 600×900, . . . . More specifically explained, the form may be modified to further include a third unit-processing executing portion which regards, as a third target pixel, an original pixel on the subject line used as the first target pixel in the already executed unit processing, that is, a pixel on the interpolate line used as the second target pixel in the already executed unit processing and which obtains the converted pixel value of the third target pixel based on the original pixel value. In such a modified form, it is possible to execute the image processing according to the error diffusion method while inserting another interpolate line different from the above-indicated interpolate line.

(22) The image processing apparatus according to the above form (21), being arranged such that an original pixel value of one pixel that is to become the first target pixel is inputted each time when the unit processing is executed by the first unit-processing executing portion and such that the converted pixel values of the respective first and second target pixels are outputted each time when the unit processing by the first unit-processing executing portion is executed and the unit processing by the second unit-processing executing portion is executed.

The above-indicated form simplifies the input and output operation of the pixel values to and from the present image processing apparatus. Namely, as explained above, even when the sequential processing is executed, the original pixel value for one pixel is inputted to the apparatus without supplementing the pixel in advance, thereby simplifying the input operation of the pixel value. Further, even where the filtering is executed, it is not required to supplement the pixel at the time of execution of the filtering, thereby reducing the load of the filtering and increasing the speed of the image processing as a whole.

(23) The image processing apparatus according to the above form (21) or (22), wherein the processing-undergone first target pixel is the first target pixel in one unit processing previously executed by the first unit-processing executing portion, and wherein the image processing apparatus further comprises an original-pixel-value temporary memory portion which stores the original pixel value of the processing-undergone first target pixel until execution of the unit processing by the second unit-processing executing portion in which the original pixel value of the processing-undergone first target pixel is used as the pixel value of the second target pixel.

The above-indicated form is effective when the pixel which is a target for the unit processing on the interpolate line is located, in the line direction, behind the pixel which is a target for the unit processing on the subject line. In this instance, too, the image processing apparatus according to the above form may have the original-pixel-value memory portion with a considerably small memory or with small registers, simplifying the structure of the present image processing apparatus. This form is effective particularly when only one original pixel value is inputted for each unit processing.

(24) The image processing apparatus according to any one of the above modes (21)-(23), wherein a plurality of pixels which are set in the matrix of the pixels of the converted image in the vicinity of the second target pixel and whose error values are utilized for obtaining the converted pixel value of the second target pixel are defined as a plurality of second error-utilizing pixels, wherein the second unit-processing executing portion includes a second average-error-value calculating portion which calculates a second average error value that is an average error value of the plurality of second error-utilizing pixels, on the basis of an error value of each of a plurality of error-utilizing pixels on a second previous line which are set on the subject line and which are at least a part of the plurality of second error-utilizing pixels, wherein the second unit-processing executing portion is configured to correct the original pixel value of the second target pixel based on the second average error value calculated by the second average-error-value calculating portion and to obtain the converted pixel value of the second target pixel based on the pixel value obtained by the correction, and wherein the second average-error-value calculating portion is configured to calculate the second average error value, utilizing the error value of the first target pixel as an error value of one pixel among the plurality of error-utilizing pixels on the second previous line.

In the above form, the unit processing for the second target pixel is limited in terms of the calculating processing of the average error value. In detail, in this form, the error-utilizing pixels on the previous line among the error-utilizing pixels for the target pixel are made as the pixels on the subject line and the error value obtained by the unit processing for the current first target pixel is directly utilized, that is, without being inputted from the exterior of the image processing apparatus. According to this form, the error value of the first target pixel may be utilized in the unit processing that is continuously executed for the second target pixel. Accordingly, it is possible to simplify the flow of the processing by the image processing apparatus, in detail, simplify the passing of the pixel value from the first unit-processing portion to the second unit-processing portion.

(25) The image processing apparatus according to the above form (24), wherein the second unit-processing executing portion is configured to further obtain an error value of the second target pixel by the unit processing for the second target pixel, and wherein the second average-error-value calculating portion is configured to calculate the second average error value, further on the basis of an error value of each of at least one error-utilizing pixel on a second current line each of which is continuous to each other on the interpolate line behind the second target pixel in the line direction and which is a part of the plurality of second error-utilizing pixels.

In the above form, the error-utilizing pixels for the second target pixel include the pixels on the above-indicated interpolate line as the current line.

(26) The image processing apparatus according to the above form (24) or (25), wherein the plurality of error-utilizing pixels on the second previous line are set as a plurality of pixels which are continuous to each other, and wherein the second unit-processing executing portion is configured to set the second target pixel such that the error value of the first target pixel can be utilized as an error value of a forwardmost error-utilizing pixel on the second previous line which is located forwardmost in the line direction among the plurality of error-utilizing pixels on the second previous line and to execute the unit processing for the set second target pixel.

In the above form, the positional relationship between the first target pixel and the second target pixel in the line direction is specified. In detail, the positional relationship between those two pixels is limited such that the error value of the first target pixel in the current unit processing is utilized as the error value of the forwardmost pixel among the error-utilizing pixels on the previous line for the second target pixel in the current or the following unit processing. In a form which will be explained and in which the aforementioned calculating processing of the average error value is applied to the unit processing for the second target pixel, this form is particularly effective.

(27) The image processing apparatus according to the above form (26), wherein the second average-error-value calculating portion includes: a plurality of second previous-line multiplying sections which are virtually disposed in the line direction and each of which executes multiplication processing of the error value of the forwardmost error-utilizing pixel on the second previous line and a corresponding one of weighting coefficients that are respectively set in correspondence with the plurality of error-utilizing pixels on the second previous line, a number of the plurality of second previous-line multiplying sections corresponding to a number of the plurality of error-utilizing pixels on the second previous line; and a plurality of second previous-line addition memory sections which are provided so as to respectively correspond to the plurality of the second previous-line multiplying sections and whose number corresponds to a number of the plurality of error-utilizing pixels on the second previous line, a rearmost one of the plurality of second previous-line addition memory sections in the line direction being configured to store a multiplied value obtained after the multiplication processing executed by one of the plurality of second previous-line multiplying sections that corresponds to itself while each of the rest of the plurality of second previous-line addition memory sections being configured to add a memory value of one of the plurality of second previous-line addition memory sections that is located immediately behind itself and a multiplied value obtained after the multiplication processing executed by one of the plurality of second previous-line multiplying sections that corresponds to itself and to store an added value obtained by the addition processing, and wherein the second average-error-value calculating portion is configured such that the processing of each of the plurality of second previous-line addition memory sections is sequentially executed in order from a forwardmost one of the plurality of second previous-line addition memory sections in the line direction and such that the second average error value is calculated based on a memory value of the forwardmost one of the plurality of second previous-line addition memory sections.

(28) The image processing apparatus according to the above form (27), wherein the second unit-processing executing portion is configured to further obtain an error value of the second target pixel by the unit processing for the second target pixel, wherein the second average-error-value calculating portion is configured to calculate the second average error value, further on the basis of an error value of each of at least one error-utilizing pixel on a second current line each of which is continuous to each other on the interpolate line behind the second target pixel in the line direction and which is a part of the plurality of second error-utilizing pixels, wherein the second average-error-value calculating portion includes: at least one second current-line multiplying section which is virtually disposed in the line direction and each of which executes multiplication processing of an error value of a pixel located immediately behind the second target pixel and a corresponding one of weighting coefficients each being set in correspondence with each of the at least one error-utilizing pixel on the second current line, the number of the at least one second current-line multiplying section corresponding to a number of the at least one error-utilizing pixel on the second current line; and at least one second current-line addition memory section each of which is provided so as to correspond to each of the at least one second current-line multiplying section and whose number corresponds to a number of the at least one error-utilizing pixel on the second current line, a rearmost one of the at least one second current-line addition memory section in the line direction being configured to store a multiplied value obtained after the multiplication processing executed by one of the at least one second current-line multiplying section that corresponds to itself while each of the rest of the at least one second current-line addition memory section being configured to add a memory value of one of the at least one second current-line addition memory section that is located immediately behind itself and a multiplied value obtained after the multiplication processing executed by one of the at least one second current-line multiplying section that corresponds to itself and to store an added value obtained by the addition processing, and wherein the second average-error-value calculating portion is configured such that the processing of each of the at least one second current-line addition memory section is sequentially executed in order from a forwardmost one of the at least one second current-line addition memory section in the line direction and such that the second average error value is calculated based on a memory value of the forwardmost one of the at least one second current-line addition memory section.

(29) The image processing apparatus according to the above form (28), wherein the second average-error-value calculating portion is configured to calculate, as the second average error value, a sum of the memory value of the forwardmost one of the plurality of second previous-line addition memory sections and the memory value of the forwardmost one of the at least one second current-line addition memory section.

In the above-indicated three forms, the aforementioned characteristic calculating processing of the average error value is applicable to the unit processing for the second target pixel. The structure relating to the calculating processing of the average error value described in those three forms is similar to that relating to the above-indicated processing, and its detailed explanation is omitted here. Those three forms enjoy the merits of the above-indicated processing.

(30) The image processing apparatus according to any one of the above forms (21)-(29), wherein a plurality of pixels which are set in the matrix of the pixels of the converted image in the vicinity of the first target pixel and whose error values are utilized for obtaining the converted pixel value of the first target pixel are defined as a plurality of first error-utilizing pixels, wherein the first unit-processing executing portion includes a first average-error-value calculating portion which calculates a first average error value that is an average error value of the plurality of first error-utilizing pixels, on the basis of an error value of each of a plurality of error-utilizing pixels on a first previous line which are set on the interpolate line in a previous line processing and which are at least a part of the plurality of first error-utilizing pixels, and wherein the first unit-processing executing portion is configured to correct the original pixel value of the first target pixel based on the first average error value calculated by the first average-error-value calculating portion and to obtain the converted pixel value of the first target pixel based on the pixel value obtained by the correction.

(31) The image processing apparatus according to the above form (30), wherein the first average-error-value calculating portion is configured to calculate the first average error value, further on the basis of an error value of each of at least one error-utilizing pixel on a first current line each of which is continuous to each other on the subject line behind the first target pixel in the line direction and which is a part of the plurality of first error-utilizing pixels.

(32) The image processing apparatus according to the above form (30) of (31), wherein the first average-error-value calculating portion is configured to calculate the first average error value, utilizing an error value of a correlated pixel which is one pixel made as the second target pixel in one unit processing of a previous line processing and which is correlated with the first target pixel, as an error value of one pixel among the plurality of error-utilizing pixels on the first previous line.

In the above-indicated three forms, a processing similar to the above-indicated calculating processing of the average error value for the second target pixel is applied to the unit processing for the first target pixel. The explanation of the calculating processing of the average error described in those three forms overlap the above explanation, and the explanation is not made here.

(33) The image processing apparatus according to the above form (32), wherein the second unit-processing executing portion is configured to further obtain an error value of the second target pixel by the unit processing for the second target pixel, and wherein the image processing apparatus is arranged such that the error value of the second target pixel is outputted each time when the unit processing is executed by the second unit-processing executing portion and such that an error value of one pixel that is to become the correlated pixel is inputted each time when the unit processing is executed by the first unit-processing executing portion.

In this form, the input and output of the error value to and from the present image processing apparatus is limited. In this form, because the passing of the error value from the first unit-executing portion to the second unit-processing executing portion can be made within the apparatus, only one error value is inputted to and outputted from the apparatus in each of the series of unit processing executed by the two unit-processing executing portions, thereby simplifying the input and output operation.

(34) The image processing apparatus according to the above form (32) or (33), wherein the plurality of error-utilizing pixels on the first previous line are set as a plurality of pixels which are continuous to each other, and wherein the first unit-processing executing portion is configured to execute the unit processing for the first target pixel, utilizing the error value of the correlated pixel as an error value of a forwardmost error-utilizing pixel on the first previous line which is located forwardmost in the line direction among the plurality of error-utilizing pixels on the first previous line.

In this form, the positional relationship, in the line direction, between the first target pixel and the error-utilizing pixels to be utilized in the unit processing for the first target pixel is limited.

(35) The image processing apparatus according to the above form (34), wherein the first average-error-value calculating portion includes: a plurality of first previous-line multiplying sections which are virtually disposed in the line direction and each of which executes multiplication processing of the error value of the forwardmost error-utilizing pixel on the first previous line and a corresponding one of weighting coefficients that are respectively set in correspondence with the plurality of error-utilizing pixels on the first previous line, the number of the plurality of first previous-line multiplying sections corresponding to a number of the plurality of error-utilizing pixels on the first previous line; and a plurality of first previous-line addition memory sections which are provided so as to respectively correspond to the plurality of the first previous-line multiplying sections and whose number corresponds to a number of the plurality of error-utilizing pixels on the first previous line, a rearmost one of the plurality of first previous-line addition memory sections in the line direction being configured to store a multiplied value obtained after the multiplication processing executed by one of the plurality of first previous-line multiplying sections that corresponds to itself while each of the rest of the plurality of first previous-line addition memory sections being configured to add a memory value of one of the plurality of first previous-line addition memory sections that is located immediately behind itself and a multiplied value obtained after the multiplication processing executed by one of the plurality of first previous-line multiplying sections that corresponds to itself and to store an added value obtained by the addition processing, and wherein the first average-error-value calculating portion is configured such that the processing of each of the plurality of first previous-line addition memory sections is sequentially executed in order from a forwardmost one of the plurality of first previous-line addition memory sections in the line direction and such that the first average error value is calculated based on a memory value of the forwardmost one of the plurality of first previous-line addition memory sections.

(36) The image processing apparatus according to the above form (35), wherein the first average-error-value calculating portion is configured to calculate the first average error value, further on the basis of an error value of each of at least one error-utilizing pixel on a first current line each of which is continuous to each other on the subject line behind the first target pixel in the line direction and which is a part of the plurality of first error-utilizing pixels, wherein the first average-error-value calculating portion includes: at least one first current-line multiplying section which is virtually disposed in the line direction and each of which executes multiplication processing of an error value of a pixel located immediately behind the first target pixel and a corresponding one of weighting coefficients each being set in correspondence with each of the at least one error-utilizing pixel on the first current line, the number of the at least one first current-line multiplying section corresponding to a number of the at least one error-utilizing pixel on the first current line; and at least one first current-line addition memory section each of which is provided so as to correspond to each of the at least one first current-line multiplying section and whose number corresponds to a number of the at least one error-utilizing pixel on the first current line, a rearmost one of the at least one first current-line addition memory section in the line direction being configured to store a multiplied value obtained after the multiplication processing executed by one of the at least one first current-line multiplying section that corresponds to itself while each of the rest of the at least one first current-line addition memory section being configured to add a memory value of one of the at least one first current-line addition memory section that is located immediately behind itself and a multiplied value obtained after the multiplication processing executed by one of the at least one first current-line multiplying section that corresponds to itself and to store an added value obtained by the addition processing, and wherein the first average-error-value calculating portion is configured such that the processing of each of the at least one first current-line addition memory section is sequentially executed in order from a forwardmost one of the at least one first current-line addition memory section in the line direction and such that the first average error value is calculated based on a memory value of the forwardmost one of the at least one first current-line addition memory section.

(37) The image processing apparatus according to the above form (36), wherein the first average-error-value calculating portion is configured to calculate, as the first average error value, a sum of the memory value of the forwardmost one of the plurality of first previous-line addition memory sections and the memory value of the forwardmost one of the at least one first current-line addition memory section In the above-indicated three forms, the aforementioned characteristic calculation processing of the average error value is applied to the unit processing for the first target pixel as in the unit processing for the second target pixel. The structure relating to the calculating processing of the average error value described in those three forms is similar to that relating to the processing explained above, and its detailed explanation is not given here. Those three forms enjoy not only the merits assured by the image processing explained above, but also merits which may be assured when the above-indicated calculating processing is applied to the unit processing for the first target pixel.

(38) The image processing apparatus according to any one of the above forms (21)-(37), wherein a plurality of pixels which are set in the matrix of the pixels of the converted image in the vicinity of the first target pixel and whose error values are utilized for obtaining the converted pixel value of the first target pixel are defined as a plurality of first error-utilizing pixels while a plurality of pixels which are set in the matrix of the pixels of the converted image in the vicinity of the second target pixel and whose error values are utilized for obtaining the converted pixel value of the second target pixel are defined as a plurality of second error-utilizing pixels, wherein the first unit-processing executing portion includes a first average-error-value calculating portion for calculating a first average error value which is an average error value of the plurality of first error-utilizing pixels, and wherein the second unit-processing executing portion includes a second average-error-value calculating portion for calculating a second average error value which is an average error value of the plurality of second error-utilizing pixels.

In this form, the above-indicated first and second average-error-value calculating portions are incorporated in the first and second unit-processing executing portions, respectively.

(39) The image processing apparatus according to the above form (38), further comprising a single converted-pixel-value determining portion: which corrects the original pixel value of the first target pixel on the basis of the first average error value calculated by the first average-error-value calculating portion and determines the converted pixel value of the first target pixel on the basis of the pixel value obtained by the correction; and which corrects the pixel value of the second target pixel on the basis of the second average error value calculated by the second average-error-value calculating portion and determines the converted pixel value of the second target pixel on the basis of the pixel value obtained by the correction.

(40) The image processing apparatus according to the above form (37) or (38), further comprising a single error-value calculating portion: which calculates the error value of the first target pixel on the basis of a pixel value obtained by correction of the original pixel value of the first target pixel based on the first average error value calculated by the first average-error-value calculating portion and the converted pixel value of the first target pixel obtained based on the pixel value obtained by the correction; and which calculates the error value of the second target pixel on the basis of a pixel value obtained by correction of the original pixel value of the second target pixel based on the second average error value calculated by the second average-error-value calculating portion and the converted pixel value of the second target pixel obtained based on the pixel value obtained by the correction.

In the above-indicated two forms, where the first average error-value calculating portion and the second average-error-value calculating portion are incorporated in the first unit-processing executing portion and the second unit-processing executing portion, respectively, the converted-pixel-value determining portion and the error-value calculating portion to be owned by each of the first and second unit-processing executing portions are commonly owned by the two unit-processing executing portions. Those two forms are effective particularly when the present image processing apparatus is constituted principally by an electronic circuit and an electric circuit. Namely, even where the apparatus has the two unit-processing portions, the circuit portion corresponding to the converted-pixel-value determining portion and the circuit portion corresponding to the error-value-calculating portion can be respectively made only one, thereby simplifying the circuit structure of the apparatus. As for the respective processings by the converted-pixel-value determining portion and the error-value-calculating portion, conventionally employed various processings can be employed. Because such conventional processings are known in the art, a detailed explanation thereof is dispensed with.

(51) An image processing method of converting image data of an original image composed of a plurality of pixels defined as a matrix into image data of a converted image composed of a plurality of pixels defined as another matrix in which the matrix of the original image has been interpolated by lines of pixels, while inserting pixels between any adjacent two lines in the matrix of the original image, by a processing according to an error diffusion method, wherein a pixel value of each of the plurality of pixels that constitute the image data of the original image is defined as an original pixel value, a pixel value of each of the plurality of pixels that constitute the image data of the converted image is defined as a converted pixel value, each of lines of the pixels in the matrix of the pixels of the original image, said each of the lines also existing in the matrix of the pixels of the converted image, is defined as an original line, each of lines of the pixels for interpolating the matrix of the pixels of the original image in correspondence with the original line is defined as an interpolate line, and a processing for one pixel according to the error diffusion method is defined as a unit processing, the method comprising:

executing the unit processing for a first target pixel as one pixel existing on a subject line as one original line and obtaining a converted pixel value and an error value of the first target pixel based on the original pixel value of the first target pixel;

setting the original pixel value of a processing-undergone first target pixel that has been made as the first target pixel in already executed one unit processing, as an original pixel value of a second target pixel that is correlated, on the interpolate line corresponding to the subject line, with the first target pixel;

executing, while utilizing the obtained error value of the first target pixel, the unit processing for the second target pixel based on the original pixel value of the second target pixel, and obtaining a converted pixel value of the second target pixel;

repeating the unit processing on the first target pixel for the subject line and the unit processing on the second target pixel for the interpolate line while the first target pixel and the second target pixel are sequentially shifted forward in the line direction; and carrying out the repetition of the unit processing on the first target pixel and the unit processing on the second target pixel out while sequentially shifting the subject line.

The above-indicated form is a form of the claimable invention in which the category is an image processing method. The explanation of this form overlaps the explanation of the above-described forms that belong to the category of the image processing apparatus, the explanation is not given here. While specific structures of this form are omitted for the sake of brevity, the image processing method of the claimable invention can be modified in various forms in which the technical features in the above-indicated forms relating to the image processing apparatus are applicable to this form.

BRIEF DESCRIPTION OF THE DRAWINGS

The above and other objects, features, advantages and technical and industrial significance of the claimable invention will be better understood by reading the following detailed description of presently preferred embodiments of the invention, when considered in connection with the accompanying drawings, in which:

FIG. 3 is a schematic table indicating weighting coefficients set in the image processing by the image processing apparatus of the embodiment;

DETAILED DESCRIPTION OF PREFERRED EMBODIMENTS

There will be described in detail one embodiment and a modified embodiment of the claimable invention with reference to the drawings, taking an image processing apparatus constituted by an electronic circuit, as an example. It is to be understood, however, that the claimable invention may be embodied with various changes and modifications, such as those described in the FORMS OF THE INVENTION, which may occur to those skilled in the art.

Outline of Image Processing

Figure 1:
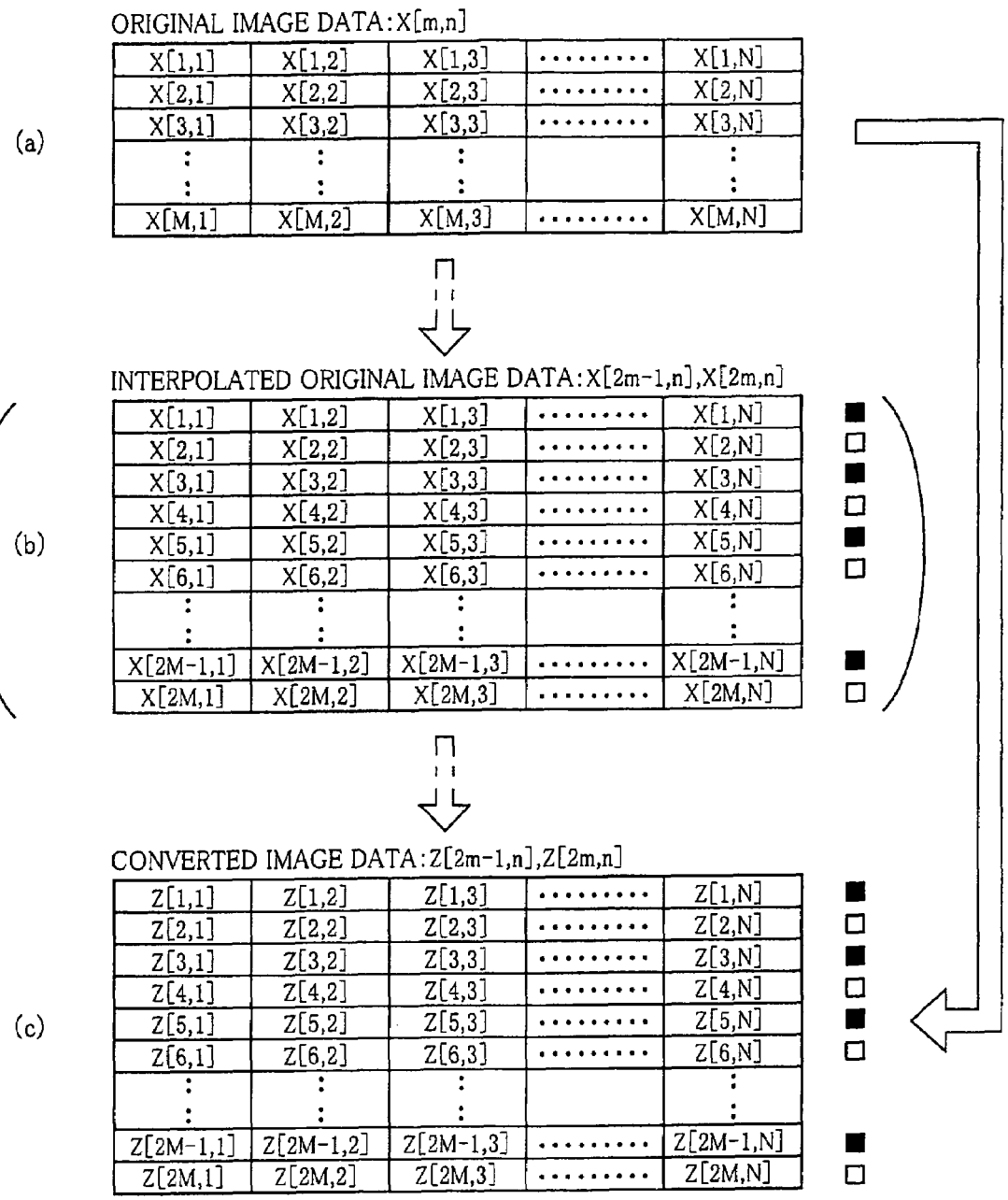
FIG. 1 is a schematic table indicating image data of an original image to be processed by an image processing apparatus according to one embodiment of the invention and image data of a converted image obtained by executing image processing by the image processing apparatus.

An original image to be converted by the image processing apparatus according to the present embodiment is defined as a matrix in which the number of pixels in a column direction (the number of lines) is M and the number of pixels in a line direction (the number of columns) is N, as shown in FIG. 1(a). The line and the column are generally referred to as "m line" and "n column", respectively. A pixel is represented as [m, n] in correspondence with the m line and the n column, and a pixel value of the pixel, i.e., an original pixel value, is represented as "X" or X[m, n] in correspondence with the position of the pixel. The original pixel value X is a discrete gradation value ranging from 0 to 255 in steps of 1. The image data of the original image is constituted as a collection of the original pixel values X [m, n].

A converted image is defined as a matrix in which the number of pixels in the column direction is 2M and the number of pixels in the line direction is N, as shown in FIG. 1(c). That is, in the matrix of the converted image, the number of lines is twice that in the matrix of the original image. In the converted image, an interpolate line is inserted between any adjacent two original lines existing in the original image. Where the lines in the converted image are generally referred to as "2m-1 line" and "2m line", the "2m-1 line" is the original line and the "2m line" is the interpolate line inserted with respect to the "2m-1 line". In the figure, the original lines are denoted by a mark "■" while the interpolate lines are denoted by a mark "□". As in the original image, the column is generally referred to as "n column". The pixel on the original line is represented as [2m-1, n] while the pixel on the interpolate line is represented as [2m, n]. A pixel value of the pixel on the interpolate line, i.e., a converted pixel value, is referred to as "Z". In detail, the pixel value of the pixel on the original line is represented as Z[2m-1, n] while the pixel value of the pixel on the interpolate line is represented as Z[2m, n], in correspondence with the position of the pixel. The converted pixel values Z are binary values consisting of 0 and 1. The image data of the converted image is constituted as a collection of the converted pixel values Z[2m-1, n] and Z[2m, n].

The conversion of the original image data into the converted image data by the error diffusion method (hereinafter may be referred to as "error diffusion processing") is conventionally carried out as follows: The original image data is temporarily formed into image data of an interpolated original image shown in FIG. 1(b). Then, the error diffusion processing is performed on that image data. In the interpolated original image data, the interpolate line is simply inserted between any two successive original lines. In detail, the interpolated original image data is formed such that each of the original pixel values on a 2m line in the respective columns is made equal to each of the pixel values on a 2m-1 line in the corresponding columns. Accordingly, the interpolated original image data is constituted as a collection of the original pixel values in which the pixel value of the pixel [2m-1, n] and the pixel value of the pixel [2m, n] are made equal to each other.

In image processing by the image processing apparatus of the present embodiment (hereinafter may be referred to as "the present image processing"), the original image data is converted directly into the converted image data without forming the above-indicated interpolated original image data. In short, the interpolation of the lines constituted by the pixels and the conversion processing of converting the original pixel values into the converted pixel values according to the error diffusion method are performed together or mixedly. Hereinafter, the present image processing will be explained with reference to the table of FIG. 2.

Figure 2:
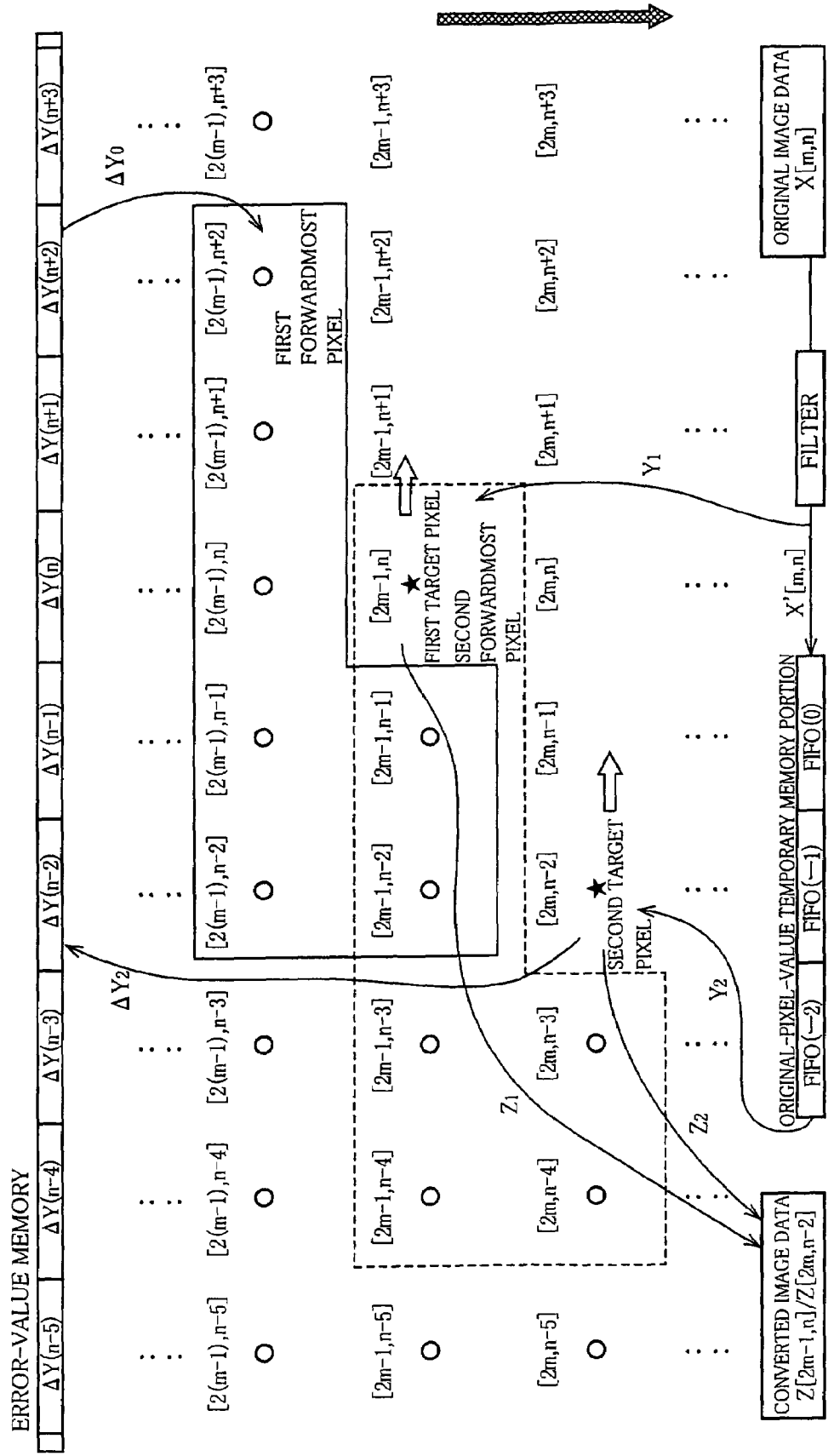
FIG. 2 is a schematic table for explaining the image processing executed by the image processing apparatus of the embodiment.

The alignment of the pixels in FIG. 2 indicates the matrix of the converted image. The intermediate 2m-1 line is the original line corresponding to the m line in the original image. The lower 2m line is the interpolate line which has been inserted between the m line and m+1 line in the original image in correspondence with the 2m-1 line. The upper line is the interpolate line which has been inserted in correspondence with the m-1 line in the original image and in which the converted pixel values Z have been already obtained at the respective pixels. The symbol "○" in FIG. 2 indicates that the converted image value Z has been obtained at each pixel.

In the present image processing, using one line in the original image as a subject line, there are executed, as a set, (1) a unit processing (a first unit processing) for one pixel on the subject line, in detail, a processing in which the original pixel value of that pixel is converted into the converted pixel value and (2) a unit processing (a second unit processing) for one pixel on the interpolate line corresponding to the subject line. Namely, the first unit processing performed with respect to a first subject pixel on the subject line whose pixel value is to be converted and the second unit processing performed with respect to a second target pixel on the interpolate line whose pixel value is to be converted are executed, whereby there are obtained the converted pixel values Z of two pixels in the converted image for the original pixel value X of the above-indicated one pixel in the original image. The obtained converted pixel values Z are outputted. The first target pixel and the second target pixel are indicated by the symbol "★" in FIG. 2. A line processing which includes all of the unit processings in a current subject line and all of the unit processings in a current interpolate line is executed while the first target pixel and the second target pixel are sequentially and respectively shfted in the line direction indicated by hollow arrows in FIG. 2 (i.e., a direction along the line of the pixels, in other words, a right and left direction in FIG. 2). The line processing is sequentially executed for all of the original lines with the subject line shifted (in a direction indicated by a shade arrow in FIG. 2), whereby the original image data is converted into the converted image data.

Hereinafter, the first unit processing and the second unit processing will be explained where the 2m-1 line is the subject line and the 2m line is the interpolate line while the pixel [2m-1, n] is the first target pixel and the pixel [2m, n-2] is the second target pixel.

In the first unit processing performed on the pixel [2m-1, n] as the first target pixel, a pixel value X[m, n] at the original pixel inputted to the present image processing apparatus is made as a pixel value $Y_1$ of the first target pixel (a first target pixel value), and there is obtained a converted pixel value $Z_1$ (a first converted pixel value) for the first target pixel value $Y_1$. (The original pixel value X is in fact an original pixel value X' after filtering and is a gradation value ranging from 0 to 255 like the original pixel value X.) In obtaining the first converted pixel value $Z_1$, there is utilized an average error value $\Delta Y_{AVE-1}$ (a first average error value) of pixels which are located in the vicinity of the first target pixel and which have been converted into the respective converted pixel values Z, that is, the average error value which is an average value of error values $\Delta Y$ of error-utilizing pixels for the first target pixel. In detail, by adding the first target pixel value $Y_1$ and the first average error value $\Delta Y_{AVE-1}$, there is obtained a corrected target pixel value $Y_1'$ (a first corrected target pixel value) which is a corrected value of the first target pixel value $Y_1$. The obtained first corrected target pixel value $Y_1'$ is compared with a threshold S for binarization. Where the first corrected target pixel value $Y_1'$ is larger than the threshold S, the first converted pixel value $Z_1$ is set at 1. Where the first corrected target pixel value $Y_1'$ is not larger than the threshold S, the first converted pixel value $Z_1$ is set at 0. The thus determined first corrected pixel value $Z_1$ is outputted as the converted pixel value Z[2m−1, n] in the converted image.

For calculation of the first average error value $\Delta Y_{AVE-1}$, the error-utilizing pixels (first error-utilizing pixels) are set for the first target pixels in a range enclosed with the solid line in FIG. 2. In detail, where the 2m−1 line as the subject line is made as a current line (a first current line) and the 2(m−1) line as the interpolate line on which a previous line processing has been performed is made as a previous line (a first previous line), there are set, as error-utilizing pixels on the previous line (error-utilizing pixels on the first previous line), five pixels [2(m−1), n−2] through [2(m−1), n+2] which are consecutively located on the first previous line such that the pixel [2(m−1), n] having the same column "n" as the first target pixel is centered, and there are set, as error-utilizing pixels on the current line (error-utilizing pixels on the first current line), two pixels [2m−1, n−2] and [2m−1, n−1] which are consecutively located on the first current line behind the first target pixel in the line direction. For each of the error-utilizing pixels, there is set a weighting coefficient K in accordance with its position relative to the target pixel, as indicated in FIG. 3. In detail, the coefficient values of Ka=1/16, Kb=1/16, Kc=4/16, Kd=1/16, Ke=1/16 are set for the respective error-utilizing pixels on the previous line in order from the rearmost one of those pixels to the forwardmost one of those pixels in the line direction. Further, the coefficient values of Kf=4/16, Kg=4/16 are set for the respective error-utilizing pixels on the current line in order from the rearmost one of those pixels to the forwardmost one of those pixels in the line direction. (It is noted that other coefficient values of Ka=1/16, Kb=2/16, Kc=4/16, Kd=2/16, Ke=1/16, Kf=2/16, Kg=4/16, for instance, may be employed.) By multiplying the error values $\Delta Y$ of the respective first error-utilizing pixels and the corresponding weighting coefficients K, there are obtained multiplied values. The obtained multiplied values for the respective first error-utilizing pixels are summed up, whereby a first average error value $\Delta Y_{AVE-1}$ is calculated. The thus calculated first average error value $\Delta Y_{AVE-1}$ is utilized in determination of the first converted pixel value $Z_1$ explained above. In the calculation of the first average error value $\Delta Y_{AVE-1}$ in the present image processing, a forwardmost error-utilizing pixel on the previous line (the forwardmost error-utilizing pixel on the first previous line, indicated as "first forwardmost pixel" in FIG. 2), which is located forwardmost in the line direction among the error-utilizing pixels on the first previous line, is one pixel which was made as the second target pixel in one unit processing in the previous line processing and which is a pixel correlated with the first target pixel (correlated pixel). Only the error value $\Delta Y$ of the forwardmost error-utilizing pixel on the previous line is inputted from the exterior to the present image processing apparatus. That is, in the present first unit processing, only the error value $\Delta Y[2(m-1), n+2]$ of the pixel [2(m−1), n+2] is inputted. (Hereinafter, this error value may be referred to as "input error value $\Delta Y_0$") The error values $\Delta Y$ of the other error-utilizing pixels are not inputted from the exterior in the current unit processing.

In the first unit processing, there is also obtained an error value for the first target pixel (a first error value) $\Delta Y_1$, on the basis of the first corrected target pixel value $Y_1'$ and the first converted pixel value $Z_1$. More specifically explained, where the converted pixel value $Z_1$ is 1, a value obtained by subtracting a maximum pixel value $Y_{MAX}$ (e.g., 255 or a value less than 255) from the first corrected target pixel value $Y_1'$ is made as the first error value $\Delta Y_1$. Where the converted pixel value $Z_1$ is 0, a value subtracting a minimum pixel value $Y_{MIN}$ (e.g., 0) from the first corrected target pixel value $Y_1'$ is made as the first error value $\Delta Y_1$.

In the second unit processing performed on the pixel [2m, n−2] located on the interpolate line as the second target pixel, the original pixel value X'[m, n] inputted in the two-time previous unit processing, that is, the original pixel value of the first target pixel in the two-time previous first unit processing, is made as a pixel value $Y_2$ of the second target pixel (a second target pixel value), and there is obtained a converted pixel value $Z_2$ for the second target pixel value $Y_2$ (a second converted pixel value), for the reasons described below. In obtaining the second converted pixel value $Z_2$, there is utilized an average error value $\Delta Y_{AVE-2}$ (a second average error value) of error-utilizing pixels for the second target pixel value $Y_2$, as in the case for the first target pixel. By adding the second target pixel value $Y_2$ and the second average error value $\Delta Y_{AVE-2}$, there is obtained a corrected target pixel value $Y_2'$ (a second corrected target pixel value) of the second target pixel value $Y_2$. The obtained second corrected target pixel value $Y_2'$ is compared with the threshold S, whereby the second converted pixel value $Z_2$ is determined. The thus determined second converted pixel value $Z_2$ is outputted as a converted pixel value Z[2m, n−2] in the converted image.

The error-utilizing pixels (the second error-utilizing pixels) for calculation of the second average error value $\Delta Y_{AVE-2}$ are set to have a positional relationship with respect to the second target pixel that is the same as a positional relationship of the first error-utilizing pixels with respect to the first target pixel, within a range enclosed by a broken line in FIG. 2. More specifically explained, where the 2m line as the interpolate line is made as a current line (a second current line) and the 2m−1 line as the subject line is made as a previous line (a second previous line), the pixels [2m−1, n−4] through [2m−1, n] on the second previous line are set as error-utilizing pixels on the previous line (error-utilizing pixels on the second previous line) while two pixels [2m, n−4] and [2m, n−3] which are consecutively located on the second current line behind the second target pixel in the line direction are set as error-utilizing pixels on the current line (error-utilizing pixels on the second current line). Further, the weighting coefficients K for the respective error-utilizing pixels are set as indicated in FIG. 3, as in the case for the first unit processing. The second average error value $\Delta Y_{AVE-2}$ is calculated by processing similar to that in the first unit processing.

In the present second unit processing, a forwardmost error-utilizing pixel on the previous line (the forwardmost error-utilizing pixel on the second previous line, indicated as "second forwardmost pixel" in the figure), which is located forwardmost in the line direction among the error-utilizing pixels on the second previous line, is a pixel [2m−1, n], and this pixel [2m−1, n] is made as the first target pixel in the current first unit processing. Accordingly, there is utilized, as the error value $\Delta Y$ of the forwardmost error-utilizing pixel on the second previous line, the first error value $\Delta Y_1$ obtained in the first unit processing as it is, in other words, without being outputted from the present image processing apparatus. In the present image processing, the relative positional relationship between the first target pixel and the second target pixel in the line direction is determined so as to permit the utilization of the first error value $\Delta Y_1$ as the error value $\Delta Y$ of the forwardmost error-utilizing pixel on the second previous line, and the second unit processing is arranged, with respect to the first unit processing, to perform the unit processing on the pixel located behind the first target pixel by two columns. Accordingly, the above-indicated original pixel value X'[m, n] made as the first target pixel value is temporarily stored in the image processing apparatus until that pixel value will be used as the second target pixel value in the forthcoming second unit processing. In the second unit processing, there is obtained an error value $\Delta Y_2$ for the second target pixel (a second error value), according to a manner similar to that in the first unit processing. The obtained second error value $\Delta Y_2$ is outputted from the image processing apparatus and stored in a memory provided outside the apparatus. The second error value $\Delta Y_2$ is utilized as the pixel value of the correlated pixel explained above in the subsequent line processing following the current line processing.

There has been explained the outline of the image processing. For differentiation of various values used in the illustrated explanation, the terms "the first" and "the second" are used to correspond to the first unit processing and the second unit processing, respectively, and the suffixes "1" and "2" are attached to the references. In the following explanation, generic terms without using the terms "the first" and "the second" may be used. In this instance, the suffixes of the references may be eliminated.

Structure of the Image Processing Apparatus

Figure 4:
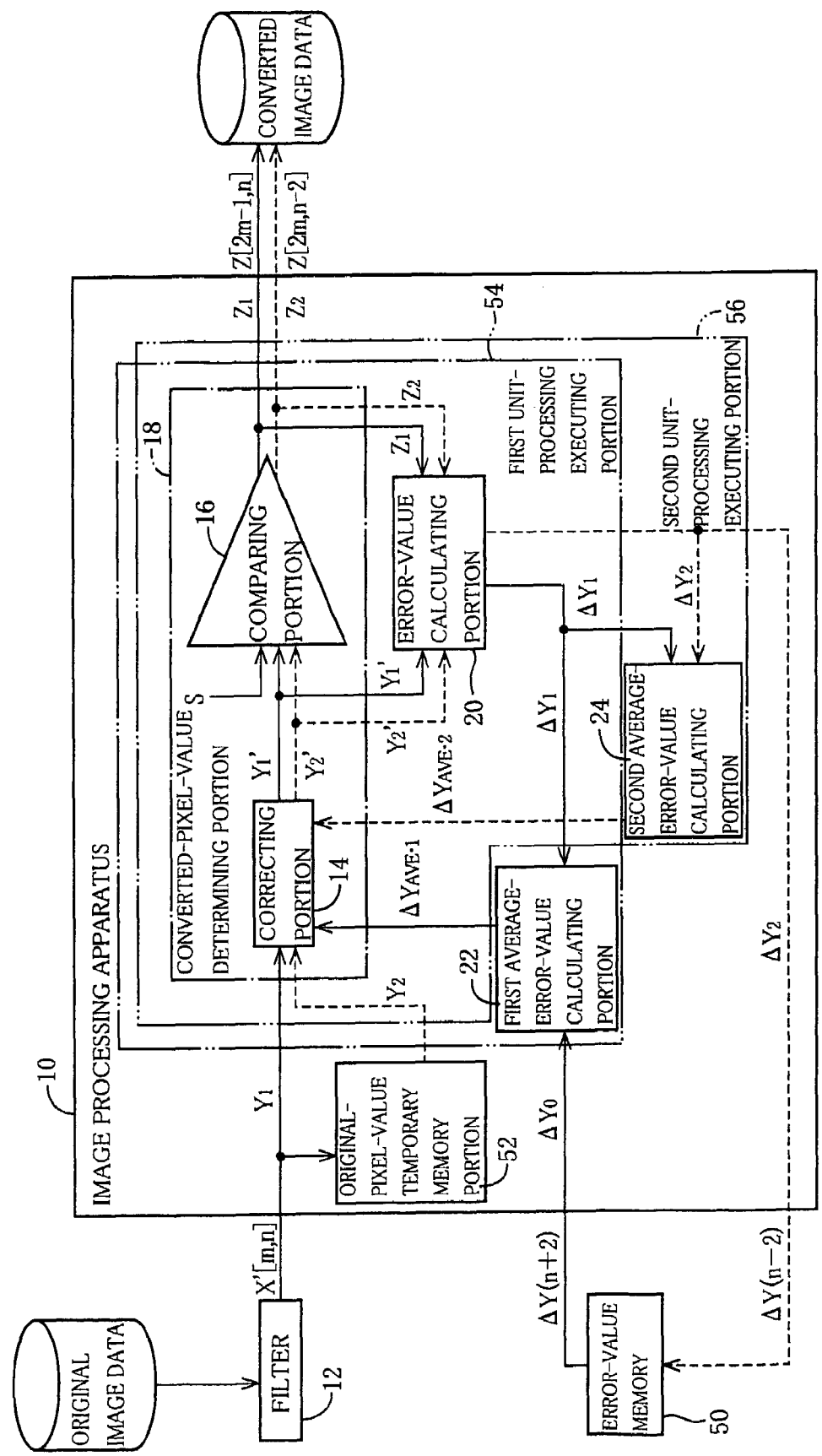
FIG. 4 is a block diagram showing a structure of the image processing apparatus of the embodiment.

The present image processing apparatus generally indicated at 10 in FIG. 4 is incorporated in a multi-function machine in which a line scanner and an ink-jet printer are included and has a structure shown in the block diagram of FIG. 4. While the original image data that is being read by the line scanner is subjected to filtering such as smoothing processing by a filter 12 disposed outside the image processing apparatus, the original pixel value (in detail, filtered original pixel value) X'[m, n] is sequentially inputted to the image processing apparatus 10. This original pixel value X'[m, n] is treated as the target pixel value Y.

The image processing apparatus 10 includes a converted-pixel-value determining portion 18 which is constituted by including a correcting portion 14 and a comparing portion 16 and which determines the converted pixel value Z for the target pixel value Y. The correcting portion 14 is constituted principally by adders. The target pixel value Y and the average error value $\Delta Y_{AVE}$ are added together by the correcting portion 14, thereby providing the corrected target pixel value Y' which is obtained by correcting the target pixel value Y by the average error value $\Delta Y_{AVE}$. The comparing portion 16 is constituted principally by comparators and arranged to obtain a binary converted pixel value Z for the target pixel by comparing the corrected target pixel value Y' and the threshold S. The image processing apparatus 10 further includes an error-value calculating portion 20 which calculates the error value $\Delta Y$ of the target pixel on the basis of the corrected target pixel value Y' and the converted pixel value Z. Further, the image processing apparatus 10 includes two average-error-value calculating portions for calculating the average error values $\Delta Y_{AVE}$ of the error-utilizing pixels in the aforementioned two unit processings, respectively. In detail, one of them is a first average-error-value calculating portion 22 for calculating the first average error value $\Delta Y_{AVE-1}$ in the first unit processing based on the input error value $\Delta Y_0$ externally inputted to the image processing apparatus 10. The other is a second average-error-value calculating portion 24 for calculating the second average error value $\Delta Y_{AVE-2}$ in the second unit processing.

Figure 5:
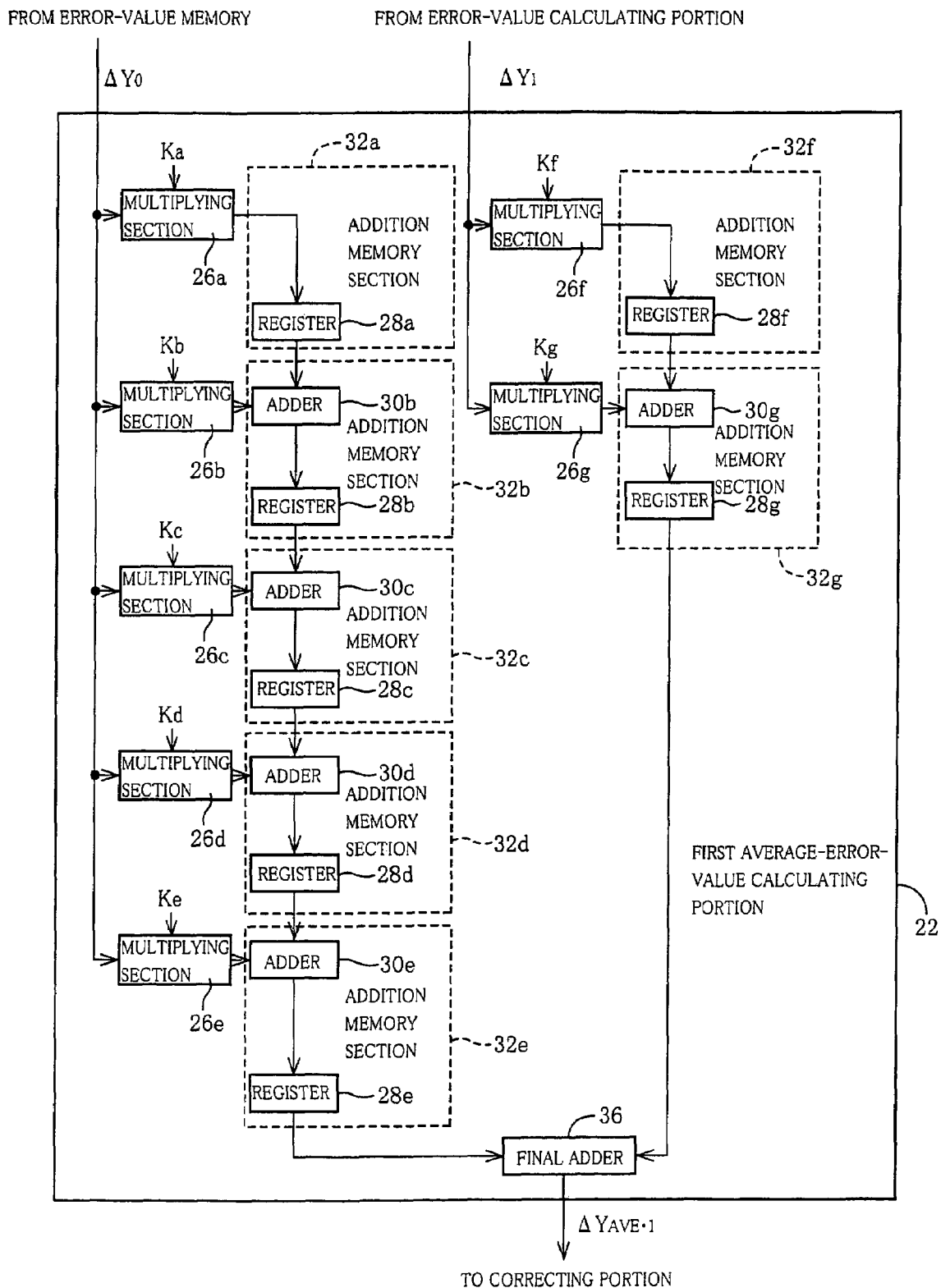
FIG. 5 is a block diagram indicating a first average-error-value calculating portion of the image processing apparatus of the embodiment.

The two average-error-value calculating portions 22, 24 will be explained in detail. As shown in the block diagram of FIG. 5, the first average-error-value calculating portion 22 is constituted by including: seven multiplying sections 26a-26g each of which is constituted principally by a multiplier; seven addition memory sections 32a-32g which are constituted principally by registers 28a-28g and adders 30b-30e, 30g, respectively (It is noted that the addition memory sections 32a, 32f do not have adders.); and a final adder 36.

The multiplying sections 26a-26e and the addition memory sections 32a-32e are in one-to-one correspondence relationship. The multiplying sections 26a-26e and the addition memory sections 32a-32e correspond to the respective five error-utilizing pixels on the first previous line in the calculation of the first average error value $\Delta Y_{AVE-1}$, in detail, the respective error-utilizing pixels on the first previous line from the rearmost one of those to the forwardmost one of those in the line direction in the order of the suffixes from "a" to "e" of the multiplying sections 26a-26e and the addition memory sections 32a-32e. According to the arrangement, the multiplying sections 26a-26e and the addition memory sections 32a-32e are virtually disposed in the line direction. That is, the upper side in FIG. 5 corresponds to the rear in the line direction while the lower side in FIG. 5 corresponds to the front in the line direction.

According to the structure described above, each of the multiplying sections 26a-26e functions as a previous-line multiplying section (a first previous-line multiplying section) while each of the addition memory sections 32a-32e functions as a previous-line addition memory section (a first previous-line addition memory section). Explained more specifically, the multiplying sections 26a-26e are arranged to execute multiplication processing of the input error value $\Delta Y_0$ of the forwardmost error-utilizing pixel on the first previous line inputted to the image processing apparatus 10 and the respective weighting coefficients Ka-Ke. Each of the addition memory sections 32b-32e is arranged to add up, by a corresponding one of the adders 30b-30e,: (a) a resultant multiplied value calculated by a corresponding one of the multiplying sections 26b-26e; and (b) a memory value stored in one of the registers 28a-28d of one of the addition memory sections 32a-32d, which one is located immediately or right behind itself in the line direction (on the upper side in FIG. 5). The added values are stored in the respective registers 28b-28e. The addition memory section 32a is arranged to store, in its register 28a, the resultant multiplied value calculated by the corresponding multiplying section 26a.

Similarly, the multiplying sections 26f, 26g and the addition memory sections 32f, 32g are in one-to-one correspondence relationship. The multiplying sections 26f, 26g and the addition memory sections 32f, 32g correspond to the respective two error-utilizing pixels on the first current line used in the calculation of the first average error value $\Delta Y_{AVE-1}$, in detail, the respective error-utilizing pixels on the first current line from the rearmost one of those to the forwardmost one of those in the line direction in the order of the suffixes from "f" to "g" of the multiplying sections 26f, 26g and the addition memory sections 32f, 32g. According to the arrangement, the multiplying sections 26f and 26g and the addition memory sections 32f, 32g are virtually disposed in the line direction, like the multiplying sections 26a-26e and the addition memory sections 32a-32e. That is, the upper side in FIG. 5 corresponds to the rear in the line direction while the lower side in FIG. 5 corresponds to the front in the line direction.

According to the structure described above, each of the multiplying sections 26f, 26g functions as a current-line multiplying section (a first current-line multiplying section) while each of the addition memory sections 32f, 32g functions as a current-line addition memory section (a first current-line addition memory section). More specifically described, each of the multiplying sections 26f, 26g is arranged to execute multiplication processing of a corresponding one of the weighting coefficients Kf, Kg and the first error value $\Delta Y_1$ which is the error value of the current first target pixel calculated by the error-value calculating portion 20. Here, the first error value $\Delta Y_1$ corresponds to the error value $\Delta Y$ of the pixel located immediately behind the first target pixel on the first current line in the next first unit processing. The addition memory section 32g is arranged to add up, by the corresponding adder 30g,: (a) a resultant multiplied value calculated by the corresponding multiplying section 26g; and (b) a memory value stored in the register 28f of the addition memory section 32g which is located immediately behind itself in the line direction (on the upper side in FIG. 5). The added value is stored in its register 28g. The addition memory section 32f is arranged to store, in its register 28f, the resultant multiplied value calculated by the corresponding multiplying section 26f.

The first average-error-value calculating portion 22 is arranged such that the value of the register 28e of the addition memory section 32e and the value of the register 28g of the addition memory section 32g are added together by the final adder 36. The addition memory sections 32a-32e and the addition memory sections 32f, 32g are arranged such that the processing is sequentially executed from the forwardmost one in the line direction. Namely, the processing is sequentially executed from the one located on the lower side toward the one located on the upper side in FIG. 5. More specifically explained, in the processing by the first average-error-value calculating portion 22, there are initially executed the processing by the multiplying section 26e and the addition memory section 32e and the subsequent addition processing by the final adder 36, for thereby calculating the first average error value $\Delta Y_{AVE-1}$ of the first error-utilizing pixels for the current first target pixel. Then, there are executed the processing by the multiplying sections 26a-26d and the addition memory sections 32a-32d and the processing by the multiplying sections 26f, 26g and the addition memory sections 32f, 32g, in order from the forwardmost one of those sections in the line direction. Accordingly, the processings after calculation of the first average error value $\Delta Y_{AVE-1}$ are executed for preparation of calculating the first average error value $\Delta Y_{AVE-1}$ in the next or the following first unit processing.

Figure 6:
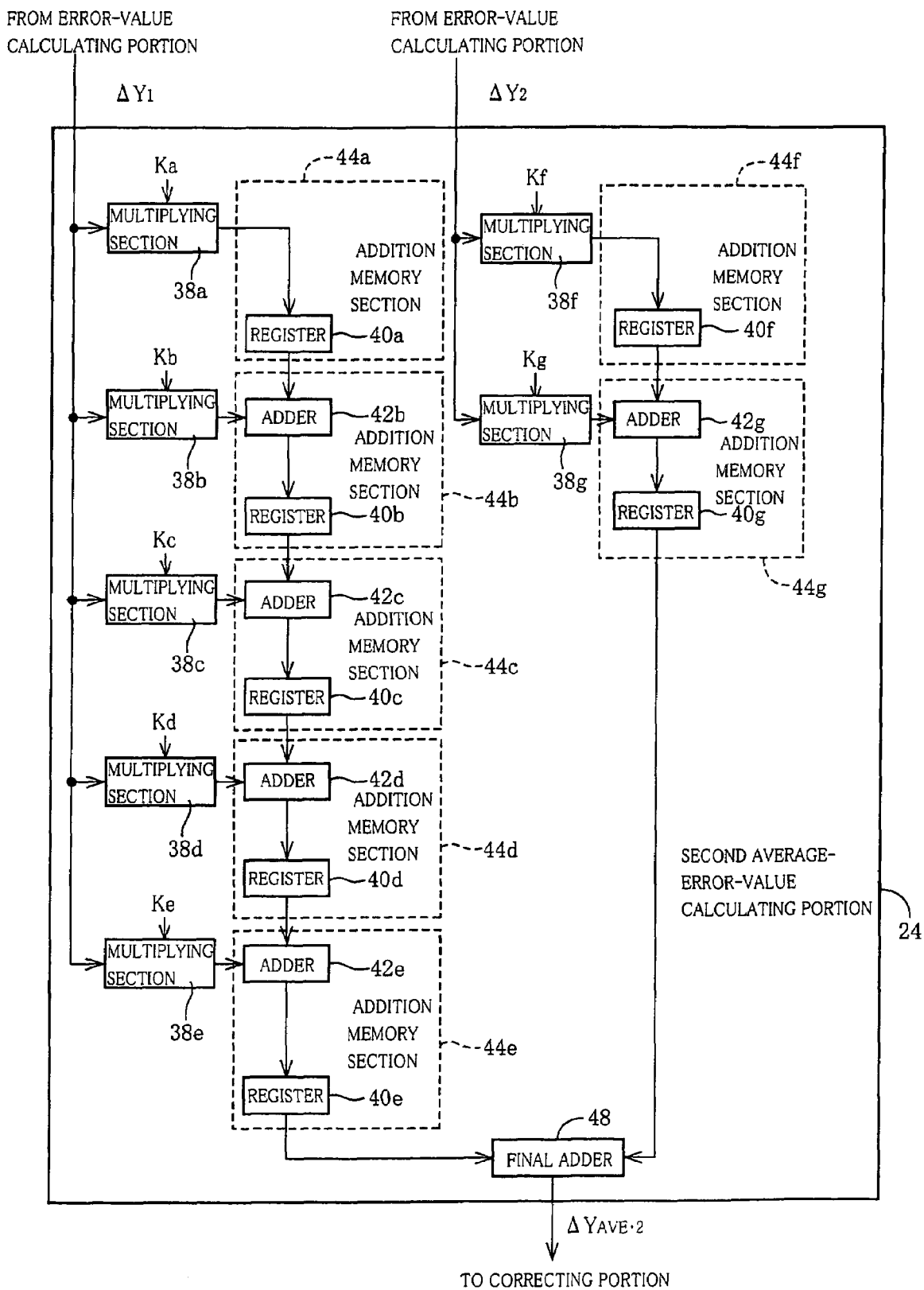
FIG. 6 is a block diagram indicating a second average-error-value calculating portion of the image processing apparatus of the embodiment.

As shown in FIG. 6, the second average-error-value calculating portion 24 includes: seven multiplying sections 38a-38g each of which is constituted principally by a multiplier; seven addition memory sections 44a-44g which are constituted principally by registers 40a-40g and adders 42b-42e, 42g, respectively (It is noted that the addition memory sections 44a, 44f do not have adders.); and a final adder 48.

The structure of the second average-error-value-calculating portion 24 is similar to that of the first average-error-value-calculating portion 22, and the explanation of which will be made briefly. The multiplying sections 38a-38e and the addition memory sections 44a-44e respectively correspond to the five error-utilizing pixels on the second previous line used in calculation of the second average error value $\Delta Y_{AVE-2}$. Each of the multiplying sections 38a-38e functions as a previous-line multiplying section (a second previous-line addition memory section) while each of the addition memory sections 44a-44e functions as a previous-line addition memory section (a second previous-line addition memory section). The multiplying sections 38f, 38g and the addition memory sections 44f, 44g respectively correspond to the two error-utilizing pixels on the second current line. Each of the multiplying sections 38f, 38g functions as a current-line multiplying section (a second current-line multiplying section) while each of the addition memory sections 44f, 44g functions as a current-line addition memory section (a second current-line addition memory section). Each of the multiplying sections 38a-38e is arranged to execute multiplication processing of a corresponding one of the weighting coefficients Ka-Ke and the first error value $\Delta Y_1$ which is the error value of the first target pixel of the current first unit processing calculated by the error-value calculating portion 20. Here, the first error value $\Delta Y_1$ corresponds to the error value of the forwardmost error-utilizing pixel on the second previous line. Each of the multiplying sections 38f, 38g is arranged to execute multiplication processing of a corresponding one of the weighting coefficients Kf, Kg and the second error value $\Delta Y_2$ which is the error value of the current second target pixel calculated by the error-value calculating portion 20. Here, the second error value $\Delta Y_2$ corresponds to the error value $\Delta Y$ of the pixel located immediately behind the second target pixel on the second current line in the next second unit processing. The processing is executed in a similar order in the first average-error-value calculating portion 24, whereby the second average error value $\Delta Y_{AVE-2}$ of the second error-utilizing pixels for the current second target pixel is calculated and there is executed preparation processing for calculating the second average error value $\Delta Y_{AVE-2}$ in the next or the following second unit processing.

An error-value memory 50 provided outside the present image processing apparatus 10 is a line memory equipped with memory segments whose number generally corresponds to the number of the pixels on one line, as shown in FIG. 2. (Actually, the error-value memory 50 includes two more segments for respective two pixels at each of the frontward end and the rearward end in the line direction, depending on the positional relationship between the first target pixel and the second target pixel in the line direction.) In the respective segments of the error-value memory 50, there are stored error values, ..., $\Delta Y(n-1)$, $\Delta Y(n)$, $\Delta Y(n+1)$, ..., in relation to the column of the pixels. Each time when the second unit processing is executed, the second error value $\Delta Y_2$ is stored in the memory segment corresponding to the column of the second target pixel. Each time when the first unit processing is executed, the input error value $\Delta Y_0$ is read out from the memory segment corresponding to the column of the correlated pixel which is correlated to the first target pixel, i.e., the column of the forwardmost error-utilizing pixel on the first previous line. It is noted that the error-value memory 50 may be provided within the image processing apparatus 10. In this case, it is possible to simplify the input and output operation of the error values between the image processing apparatus 10 and the exterior.

The image processing apparatus 10 further includes an original-pixel-value temporary memory section 52. As shown in FIG. 2, the original-pixel-value temporary memory section 52 is constituted principally by a first-in first-out register including three memory segments FIFO(0)-FIFO(−2). The memory values stored in the original-pixel-value temporary memory section 52 are arranged to be sequentially shifted in the memory segments in order from the FIFO(0) to the FIFO (−2). According to the arrangement, the original pixel value X'[m, n] inputted to the original-pixel-value temporary memory section 52 in the current unit processing is utilized as the second target pixel value $Y_2$ in the unit processing to be executed after the next unit processing.

In the structure explained above, the image processing apparatus 10 is constructed to have: a first unit-processing executing portion 54 constituted by including the converted-pixel value determining portion 18, the error-value determining portion 20, and the first average-error-value calculating portion 22; and a second unit-processing executing portion 56 constituted by including the converted-pixel-value determining portion 18, the error-value determining portion 20, and the second average-error-value calculating portion 24. Namely, the converted-pixel-value determining portion 18 and the error-value determining portion 20 are functional portions that are commonly used by the first and second unit-processing executing portion 54, 56 and are arranged to perform alternately a part of the first unit processing and a part of the second unit processing.

Flow of Image Processing

Figure 7:
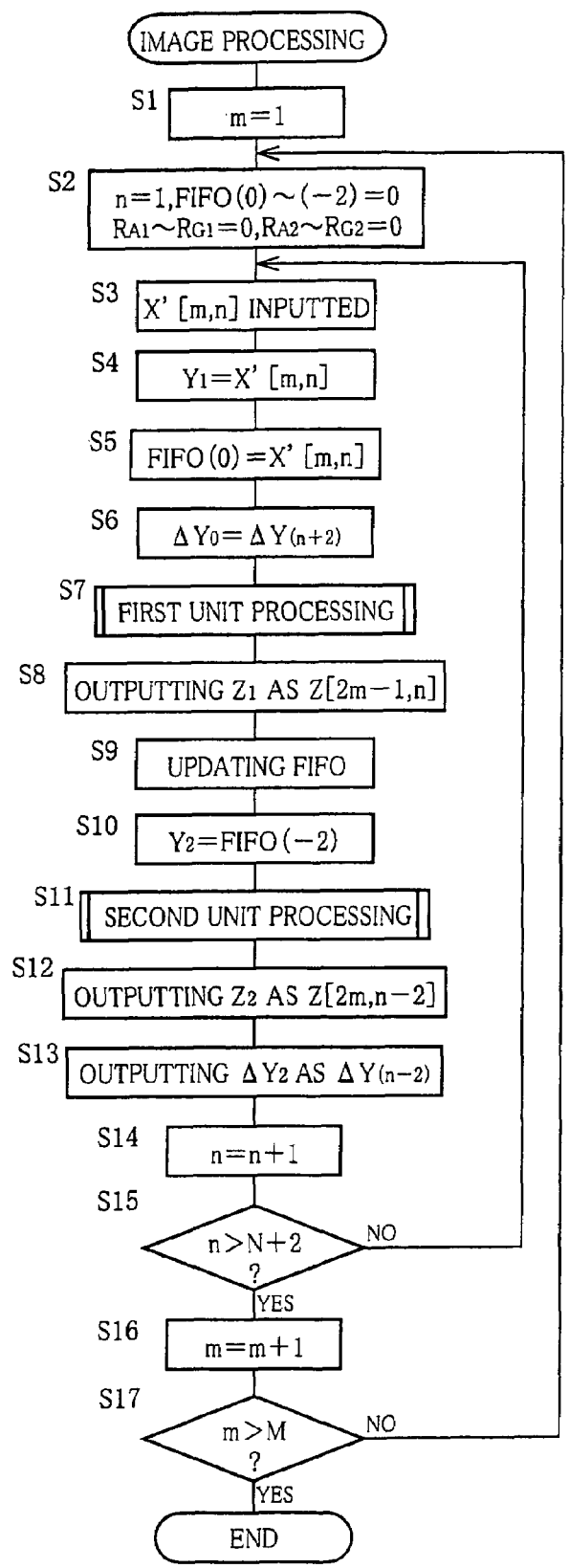
FIG. 7 is a flow chart indicating a flow of the image processing executed by the image processing apparatus of the embodiment.

FIG. 7 indicates a flow chart of the above-indicated image processing executed by the image processing apparatus 10. Hereinafter, the flow of the present image processing will be explained on the basis of the flow chart along the progress of time. Because the image processing apparatus 10 is constituted principally by an electronic circuit, two or more processings are executed in parallel. Accordingly, the process of the image processing by the present image processing apparatus 10 does not follow the flow chart in a strict sense. The flow of the processing explained herein is a guide for easier understanding of the present image processing.

In the present image processing, Step S1 (hereinafter "step" is omitted where appropriate) is implemented to reset, to 1, the value of m functioning as a line counter. S1 is followed by S2 to reset, to 1, the value of n functioning as a column counter, and to reset, to 0, the values of the memory segments FIFO(0)-FIFO(−2) of the original-pixel-value temporary memory portion 52, the register values $R_{A1}$-$R_{G1}$ of the respective registers 28a-28g of the first average-error-value calculating portion 22, and the register values $R_{A2}$-$R_{G2}$ of the respective registers 40a-40g of the second average-error-value calculating portion 24. In this respect, the values stored in all of the memory segments of the error-value memory 50 has been set at an appropriate initial value at the time of initiation of the present image processing.

Next, in S3, the original pixel value X'[m, n] of the original image after filtration is inputted to the image processing apparatus 10. Subsequently, the inputted original pixel value X'[m, n] is identified as the first target pixel value $Y_1$ in S4 and stored in the memory segment FIFO(0) of the original-pixel-value temporary memory portion 52 in S5. Then, in S6, the memory value $\Delta Y(n+2)$ stored in the memory segment of the error-value memory 50 that corresponds to the n+2 column is inputted as the input error value $\Delta Y_0$.

Figure 8:
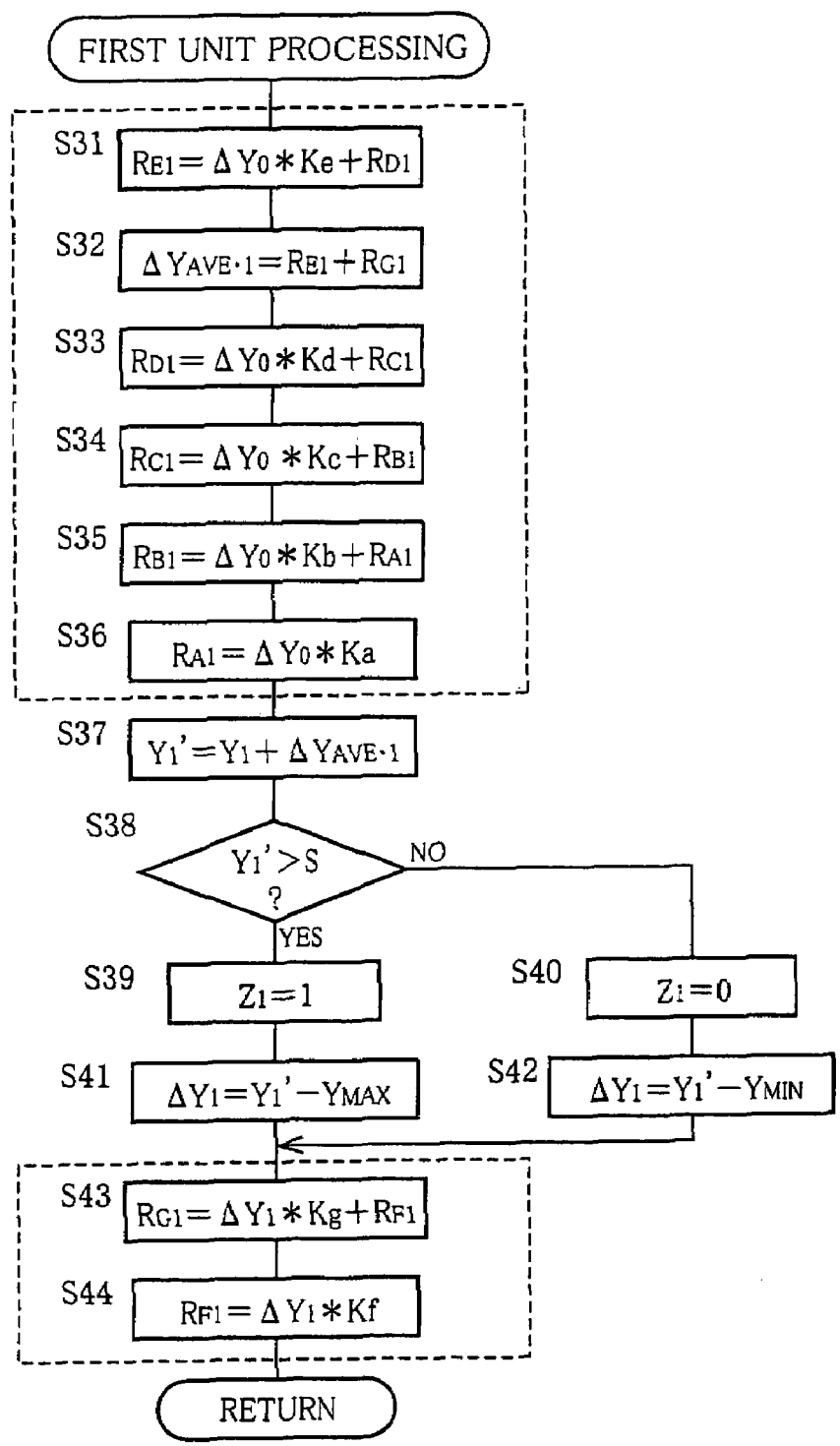
FIG. 8 is a flow chart indicating a flow of a first unit processing executed by the image processing apparatus of the embodiment.

S6 is followed by S7 in which the first unit processing indicated by a flow chart of FIG. 8 is implemented. In the first unit processing, S31 is initially implemented. In S31, the multiplying section 26e multiplies the input error value $\Delta Y_0$ and the weighting coefficient Ke together, the adder 30e of the addition memory section 32e adds up the multiplied value and the memory value of the register 28d, and the value obtained by addition is made as the register value $R_{E1}$ of the register 28e. In the subsequent S32, the register value $R_{E1}$ of the register 28e and the register value $R_{G1}$ of the register 28g are added together by the final adder 36, thereby calculating the first average error value $\Delta Y_{AVE-1}$. Then, in the following S33-S35, the multiplying sections 26d-26b multiple the input error value $\Delta Y_0$ and the respective weighting coefficients Kd-Kb. The respective multiplied values and the respective memory values of the registers 28c-28a are added by the respective adders 30d-30b of the addition memory sections 32d-32b. The values obtained by addition are respectively made as the register values $R_{D1}$-$R_{B1}$ of the respective registers 28d-28b. The processings by the multiplying sections 26d-26b and the addition memory sections 32d-32b are executed from the one located forward (the one located on the lower side in the figure). Then, in S36, the multiplying section 26a multiplies the input error value $\Delta Y_0$ and the weighting coefficient $K_1$ together, and the multiplied value is made as the register value $R_{A1}$ of the register 28a. The processings in S31-S36 are executed by the first error-value calculating portion 22. (The steps enclosed by a broken line are in the flow chart executed by the first error-value calculating portion 22.)

Next, in S37, the first target pixel value $Y_1$ and the first average error value $\Delta Y_{AVE-1}$ are added up, thereby obtaining the first corrected target pixel value $Y_1'$ which is a corrected value of the first target pixel value $Y_1$. This processing is executed by the correcting portion 14. Thereafter, S38 is implemented to judge whether or not the first corrected target pixel value $Y_1'$ is larger than the threshold S. Where the first corrected target pixel value $Y_1'$ is larger than the threshold S, S39 is implemented to determine the first converted pixel value $Z_1$ to be 1. Where the first corrected target pixel value $Y_1'$ is not larger than the threshold S, S40 is implemented to determine the first converted pixel value $Z_1$ to be 0. The processings in S38-S40 are executed by the comparing portion 16 and the processings in S37-S40 are executed by the converted-pixel-value determining portion 18. Where the first converted pixel value $Z_1$ is determined to be 1, the above-indicated maximum pixel value $Y_{MAX}$ is subtracted from the first corrected target pixel value $Y_1'$ in S41. Where the first converted pixel value $Z_1$ is determined to be 0, the above-indicated minimum pixel value $Y_{MIN}$ is subtracted from the first corrected target pixel value $Y_1'$ in S42. Thus, the first error value $\Delta Y_1$ is calculated. The processings in S41 and S42 are executed by the error-value calculating portion 20.

Next, S43 is implemented. In S43, the multiplying section 26g multiples the calculated first error value $\Delta Y_1$ and the weighting coefficient Kg together. The adder 42g of the addition memory section 44g adds up the multiplied value and the memory value of the register 28f, and the value obtained by addition is made as the register value $R_{G1}$ of the register 28g. Then, S44 is implemented in which the multiplying section 26f multiplies the first error value $\Delta Y_1$ and the weighting coefficient Kf together. The value obtained by the multiplication is made as the register value $R_{F1}$ of the register 28f. The processings in S43 and S44 are executed by the first error-value calculating portion 22. The first unit processing is completed upon completion of the processings in S43 and S44.

After the first unit processing in S7, S8 is implemented in which the determined first converted pixel value $Z_1$ is outputted as the converted pixel value Z[2m−1, n] of the pixel [2m−1, n] on the original line in the converted image. S8 is followed by S9 in which updating of the original-pixel-value temporary memory portion 52 is executed. More specifically explained, the value in the memory segment FIFO(−2) is set at the value of the memory segment FIFO(−1), and then the value of the memory segment FIFO(−1) is set at the value of the memory segment FIFO(0). Subsequently, in S10, the value of the memory segment FIFO(−2) is set at the second target pixel value $Y_2$. After the processing in S10, there is implemented in S11 the second unit processing indicated by a flow char of FIG. 9.

Because S51-S64 in the second unit processing are substantially identical with S31-S44 in the first unit processing, S51-S64 will be briefly explained. The differences between S51-S64 in the second unit processing and S31-S44 in the first unit processing are as follows: The processings executed by the first average-error-value calculating portion 22 in the first unit processing (the processings enclosed by the broken line) are executed by the second average-error-value calculating portion 24. Further, in those processings, the multiplying sections 38a-38g multiply the respective weighting coefficients Ka-Kg by the first error value $\Delta Y_1$ calculated in the first unit processing, in place of the input error value $\Delta Y_0$. By the processings executed by the second average-error-value calculating portion 24 in the second unit processing, the second average error value $\Delta Y_{AVE-2}$ is calculated. In the second unit processing, the second converted pixel value $Z_2$ is determined based on the second average error value $\Delta Y_{AVE-2}$, so that the second error value $\Delta Y_2$ is calculated.

After the second unit processing in S11, S12 is implemented in which the determined second converted pixel value $Z_2$ is outputted as the converted pixel value Z[2m, n−2] of the pixel [2m, n−2] on the interpolate line in the converted image. Then, in S13, the calculated second error value $\Delta Y_2$ is outputted to the memory segment of the error-value memory 50 that corresponds to the column of the second target pixel, as a memory value Y(n−2) to be stored in that memory segment.

Subsequently, in S14, the value of n is counted up and the value of n is then judged in S15 to be larger or not than a reference value obtained by adding 2 to the number N of columns of the original image. Where the value of n is equal to or smaller than the reference value, the processings after S3 are repeated. Where the value of n is larger than the reference value, one line processing is considered to be completed, and S16 is implemented to count up the value of m and to shift to the line processing for the next subject line. Subsequently, in S17, the value of m is judged to be larger or not than the number M of lines of the original image. Where the value of m is equal to or smaller than the number M, the processings after S2 are implemented. Where the value of m is larger than the number M, it is considered that all line processings are completed, so that the image processing is completed.

In the above processings, there exist the second unit processing where the position number of the column of the second target pixel is equal to or smaller than 0 and the first unit processing where the value of n is larger than the number N of columns of the original image. As those processings are for the second target pixel and the first target pixel which extend off the matrix of the original image, those processings are executed in a dummy-like fashion.

The image processing explained above is for the image processing apparatus that is constituted by the electronic circuit. The present image processing may be executed by an image processing apparatus constituted principally by a computer. In this case, there may be formed programs in accordance with the above-indicated flow charts, and the programs may be executed by the computer. In this instance, the functional components that really exist in the image processing apparatus 10 are made as virtual or schematic functional portions executing the processings which are executed by the really existing functional portions.

Modified Embodiment

There will be next explained a modified embodiment in which the order of the processing by the first average-error-value calculating portion 22 and the processing by the second average-error-value calculating portion 24 are interchangm-bodiment is also indicated at 10, and the same reference numeral as used in the illustrated embodiment are used to identify the corresponding components.

Figure 9:
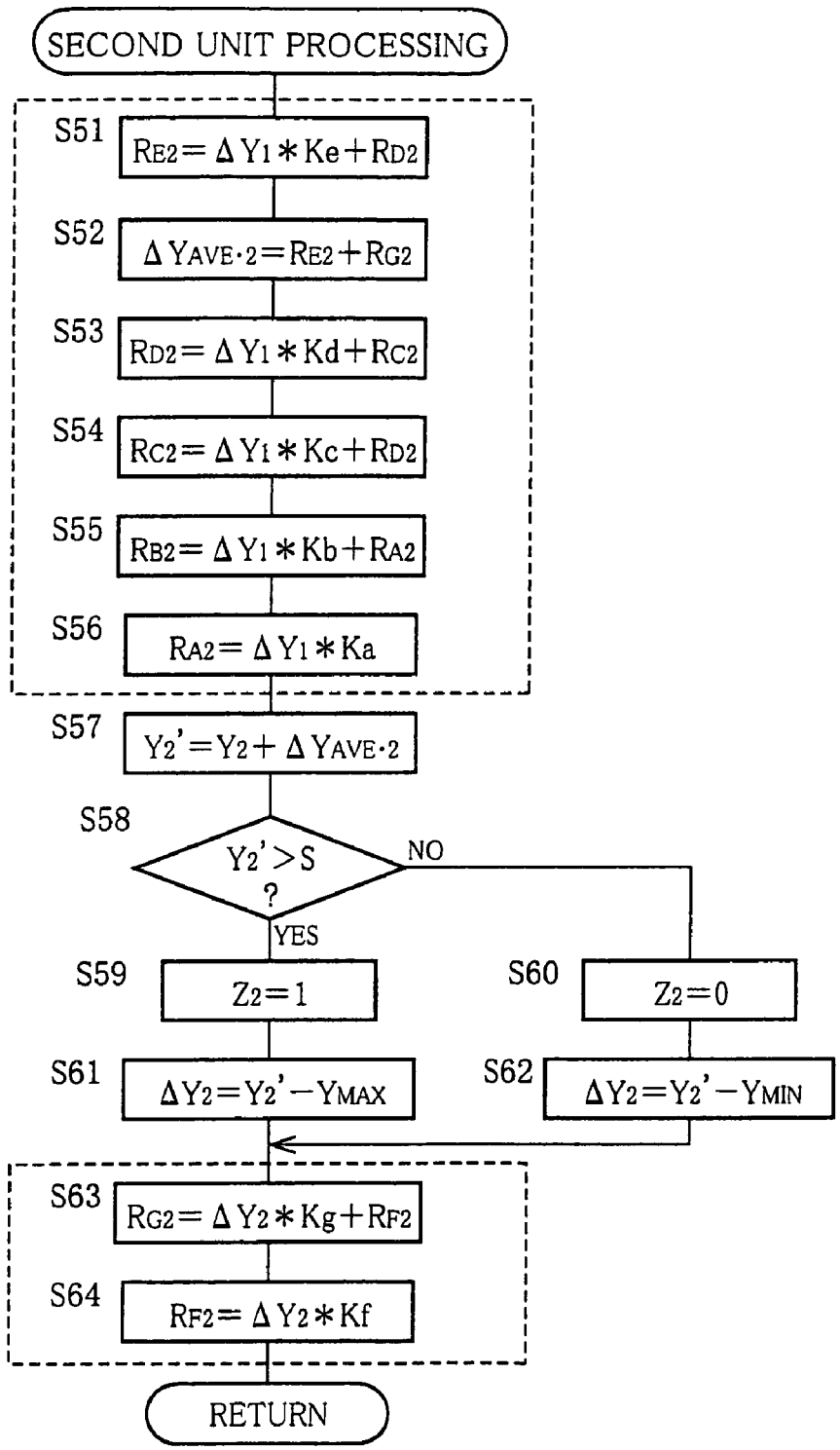
FIG. 9 is a flow chart indicating a flow of a second unit processing executed by the image processing apparatus of the embodiment.
Figure 12:
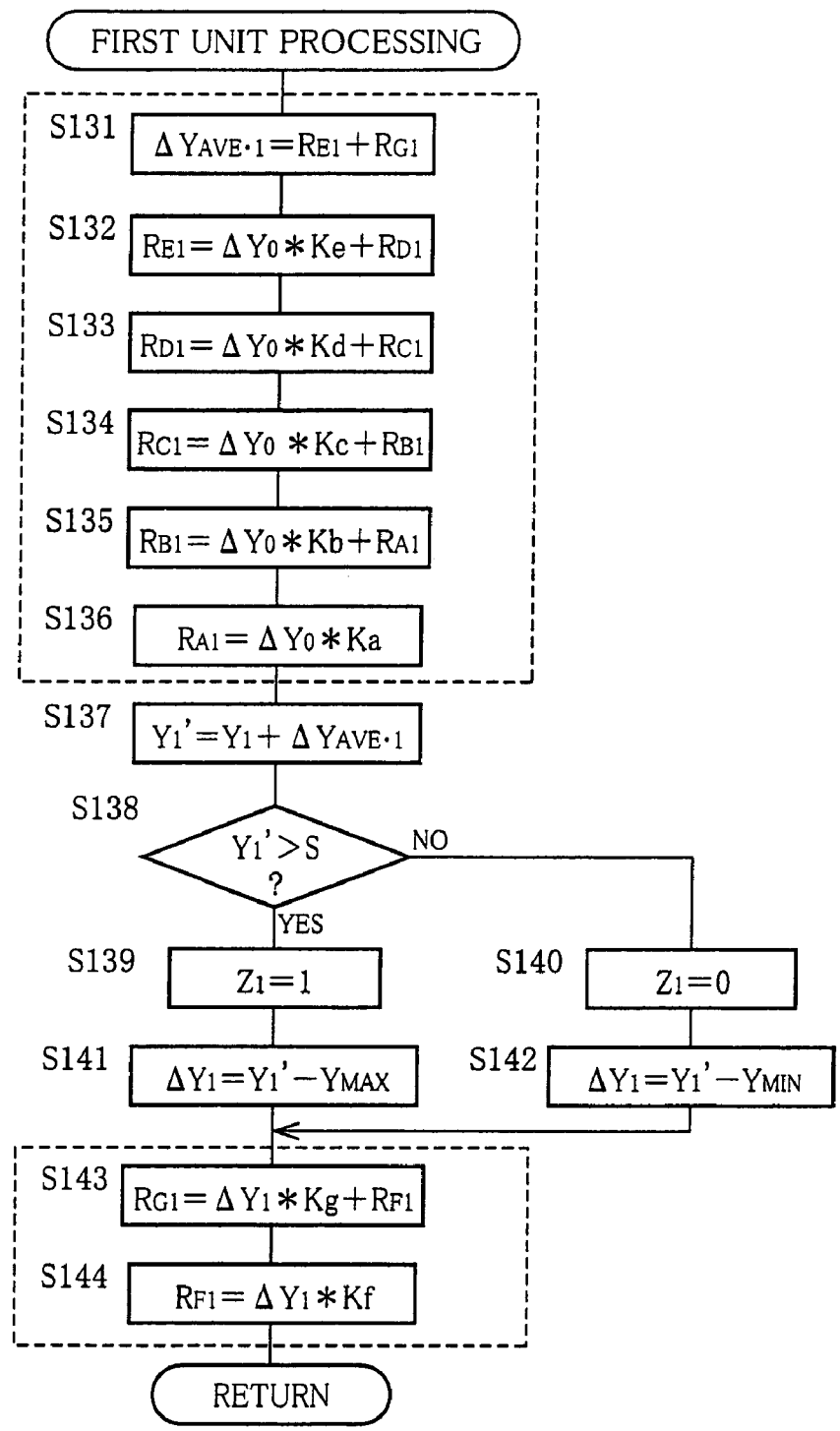
FIG. 12 is a flow chart indicating a flow of a first unit processing executed by the image processing apparatus of the modified embodiment.
Figure 13:
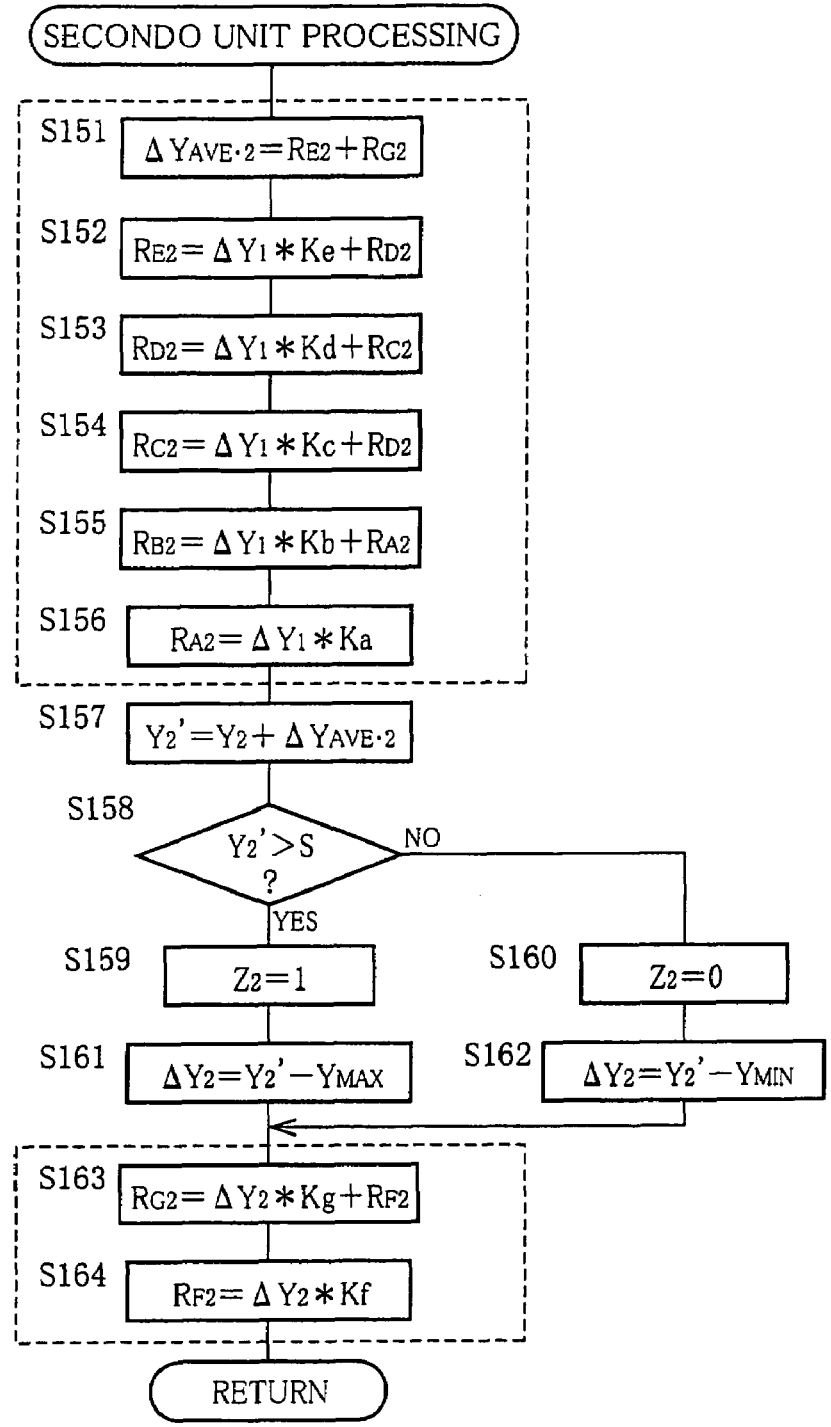
FIG. 13 is a flow chart indicating a flow of a second unit processing executed by the image processing apparatus of the modified embodiment.

In the first average-error-value calculating portion 22 and the second average-error-value calculating portion 24 of the image processing apparatus according to the modified embodiment, the calculation of the average error values are performed in the orders respectively shown in the flow charts of FIG. 12 and FIG. 13. In detail, S31 and S32 in FIG. 8 are interchanged. Further, S51 and S52 in FIG. 9 are interchanged. The explanation will be made with reference to FIGS. 5 and 6. After the addition processings by the respective final adders 36, 48 have been executed, the processings by the respective multiplying sections 26, 38 and the respective addition memory sections 32, 44 are sequentially executed in order from the one located forwardmost in the line direction (the one located on the lower side in the figure). Where the processings are executed in the orders described above, the first average error value $\Delta Y_{AVE-1}$ to be calculated is the average value of the first error-utilizing pixels for the first target pixel in the current unit processing while the second average error value $\Delta Y_{AVE-2}$ to be calculated is the average value of the second error-utilizing pixels for the second target pixel in the current unit processing. The input error value $\Delta Y_0$ to be inputted to the first average-error-value calculating portion 22 is the error value $\Delta Y$ of the forwardmost error-utilizing pixel on the first previous line that corresponds to the first target pixel in the next unit processing while the input error value $\Delta Y_1$ to be inputted to the second average-error-value calculating portion 24 is the error value $\Delta Y$ of the forwardmost error-utilizing pixel on the second previous line that corresponds to the second target pixel in the next unit processing. Namely, the processings by the multiplying sections 26, 38 and the processings by the addition memory sections 32, 44 are for preparation of calculating the first average error value $\Delta Y_{AVE-1}$ and the second average error value $\Delta Y_{AVE-2}$ in the next or the following unit processing.

Figure 10:
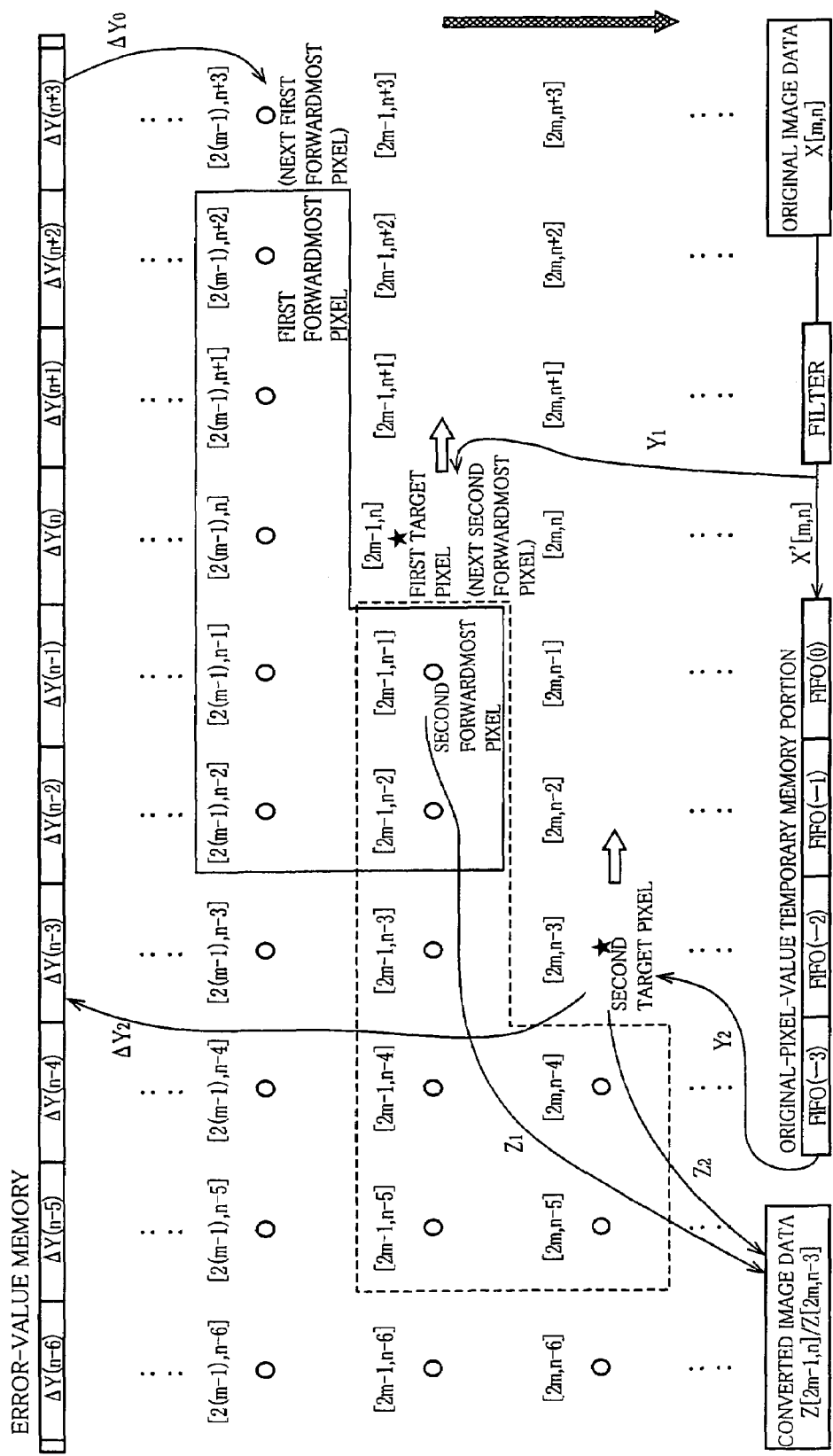
FIG. 10 is a schematic table for explaining image processing executed by an image processing apparatus according to a modified embodiment.

Accordingly, in the present image processing, where the pixel [2m−1, n] is made as the first target pixel, the input error value $\Delta Y_0$ which is inputted from the error-value memory 50 is equal to the memory value $\Delta Y(n+3)$ which is stored in the memory segment corresponding to the forwardmost error-utilizing pixel on the first previous line for the first target pixel in the next first unit processing (indicated as "the next first forwardmost pixel" in FIG. 10). Further, the second target pixel is determined to be a pixel belonging to the column which is, in the line direction, the third from and behind the column to which the first target pixel belongs, so that the error value $\Delta Y_1$ calculated in the current first unit processing becomes a forwardmost error-utilizing pixel on the second previous line for the second target pixel in the next second unit processing (indicated as "the next second forwardmost pixel" in FIG. 10).

Figure 11:
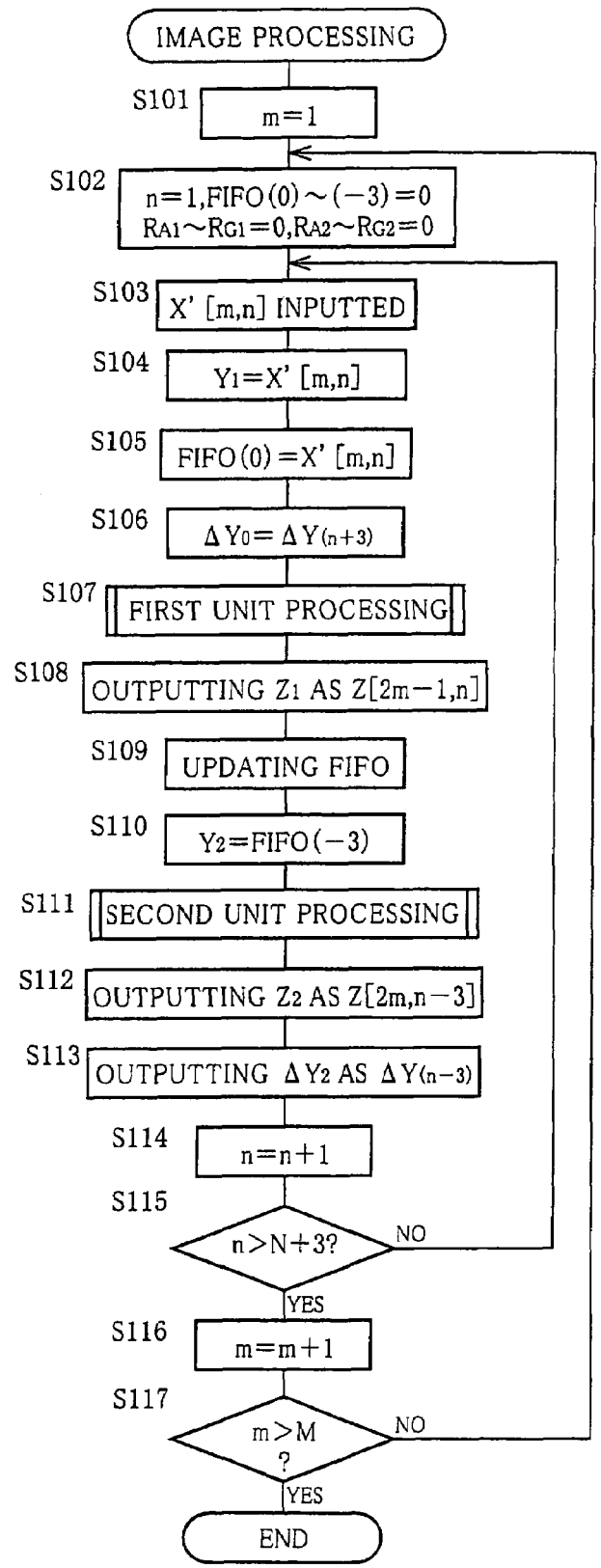
FIG. 11 is a flow chart indicating a flow of the image processing executed by the image processing apparatus of the modified embodiment.

According to the above-indicated positional relationship between the first target pixel and the second target pixel, the second error value $\Delta Y_2$ calculated in the second unit processing is made as a memeory value $\Delta Y(n−3)$ to be stored in the memory segment of the error-value memory 50 that corresponds to the column of the second target pixel. Further, the original-image-temporary memory portion 52 has one more memory segments, so that the memory portion 52 has four memory segments, i.e., FIFO(0)-FIFO(−3). In the image processing according to the modified embodiment, by the unit processing for one original pixel value X'[m, n], two converted pixel values Z[2m−1, n] and Z[2m, n−3] are obtained. The main flow of the image processing according to the modified embodiment is shown in FIG. 11. This flow is substantially the same as that explained above, and a detailed explanation of which is dispensed with. Further, because the overall structure of the image processing apparatus 10 of the modified embodiment is substantially identical with that shown in FIG. 4, the figure and the explanation of which is dispensed with.

What is claimed is:

1. An image processing apparatus used for converting image data of an original image composed of a plurality of pixels defined as a matrix into image data of a converted image composed of a plurality of pixels defined as another matrix in which the matrix of the original image has been interpolated by lines of pixels, while inserting pixels between any adjacent two lines in the matrix of the original image, by a processing according to an error diffusion method, wherein a pixel value of each of the plurality of pixels that constitute the image data of the original image is defined as an original pixel value, a pixel value of each of the plurality of pixels that constitute the image data of the converted image is defined as a converted pixel value, each of lines of the pixels in the matrix of the pixels of the original image, said each of the lines also existing in the matrix of the pixels of the converted image, is defined as an original line, each of lines of the pixels for interpolating the matrix of the pixels of the original image in correspondence with the original line is defined as an interpolate line, and a processing for one pixel according to the error diffusion method is defined as a unit processing, the image processing apparatus comprising:

a first unit-processing executing portion which executes the unit processing for a first target pixel existing on a subject line as one original line and made as a target for a current unit processing and which directly obtains a converted pixel value and an error value of the first target pixel, based on an original pixel value of the first target pixel;

a second unit-processing executing portion which sets the original pixel value of a processing-undergone first target pixel that has been made as the first target pixel in one unit processing executed by the first unit-processing executing portion, as an original pixel value of a second target pixel that is correlated, on the interpolate line corresponding to the subject line, with the first target pixel, the second unit-processing executing portion executing, while utilizing the error value of the first target pixel directly obtained by the first unit-processing executing portion, the unit processing for the second target pixel based on the original pixel value of the second target pixel and directly obtaining the converted pixel value of the second target pixel; and a controller which controls the first unit-processing executing portion and the second unit-processing executing portion, wherein the controller controls the first unit-processing executing portion and the second unit-processing executing portion so as to repeat a line processing, so that the image processing apparatus obtains the image data of the converted image which has a greater number of lines of pixels than the image data of the original image, from the image data of the original image, and wherein the controller repeats controlling of the first unit-processing executing portion and the second unit-processing executing portion such that the line processing is executed by repeating a set of the unit processing for the subject line by the first unit-processing executing portion and the unit processing for the interpolate line by the second unit-processing executing portion while sequentially shifting forward the first target pixel and the second target pixel in the line direction, and further repeats controlling of the first unit-processing executing portion and the second unit-processing executing portion such that the line processing is repeated while shifting the subject line.

2. The image processing apparatus according to claim 1, being arranged such that an original pixel value of one pixel that is to become the first target pixel is inputted each time when the unit processing is executed by the first unit-processing executing portion and such that the converted pixel values of the respective first and second target pixels are outputted each time when the unit processing by the first unit-processing executing portion is executed and the unit processing by the second unit-processing executing portion is executed.

3. The image processing apparatus according to claim 1, wherein the processing-undergone first target pixel is the first target pixel in one unit processing previously executed by the first unit-processing executing portion, and wherein the image processing apparatus further comprises an original-pixel-value temporary memory portion which stores the original pixel value of the processing-undergone first target pixel until execution of the unit processing by the second unit-processing executing portion in which the original pixel value of the processing-undergone first target pixel is used as the pixel value of the second target pixel.

4. The image processing apparatus according to claim 1, wherein a plurality of pixels which are set in the matrix of the pixels of the converted image in the vicinity of the second target pixel and whose error values are utilized for obtaining the converted pixel value of the second target pixel are defined as a plurality of second error-utilizing pixels, wherein the second unit-processing executing portion includes a second average-error-value calculating portion which calculates a second average error value that is an average error value of the plurality of second error-utilizing pixels, on the basis of an error value of each of a plurality of error-utilizing pixels on a second previous line which are set on the subject line and which are at least a part of the plurality of second error-utilizing pixels, wherein the second unit-processing executing portion is configured to correct the original pixel value of the second target pixel based on the second average error value calculated by the second average-error-value calculating portion and to obtain the converted pixel value of the second target pixel based on the pixel value obtained by the correction, and wherein the second average-error-value calculating portion is configured to calculate the second average error value, utilizing the error value of the first target pixel as an error value of one pixel among the plurality of error-utilizing pixels on the second previous line.

5. The image processing apparatus according to claim 4, wherein the plurality of error-utilizing pixels on the second previous line are set as a plurality of pixels which are continuous to each other, and wherein the second unit-processing executing portion is configured to set the second target pixel such that the error value of the first target pixel can be utilized as the error value of a forwardmost error-utilizing pixel on the second previous line which is located forwardmost in the line direction among the plurality of error-utilizing pixels on the second previous line and to execute the unit processing for the set second target pixel.

6. The image processing apparatus according to claim 5, wherein the second unit-processing executing portion is configured to further obtain an error value of the second target pixel by the unit processing for the second target pixel, wherein the second average-error-value calculating portion is configured to calculate the second average error value, further on the basis of an error value of each of at least one error-utilizing pixel on a second current line each of which is continuous to each other on the interpolate line behind the second target pixel in the line direction and which is a part of the plurality of second error-utilizing pixels, wherein the second average-error-value calculating portion includes: (a) a plurality of second previous-line multiplying sections which are virtually disposed in the line direction and each of which executes multiplication processing of the error value of the forwardmost error-utilizing pixel on the second previous line and a corresponding one of weighting coefficients that are respectively set in correspondence with the plurality of error-utilizing pixels on the second previous line, a number of the plurality of second previous-line multiplying sections corresponding to a number of the plurality of error-utilizing pixels on the second previous line; (b) a plurality of second previous-line addition memory sections which are provided so as to respectively correspond to the plurality of the second previous-line multiplying sections and whose number corresponds to a number of the plurality of error-utilizing pixels on the second previous line, a rearmost one of the plurality of second previous-line addition memory sections in the line direction being configured to store a multiplied value obtained after the multiplication processing executed by one of the plurality of second previous-line multiplying sections that corresponds to itself while each of the rest of the plurality of second previous-line addition memory sections being configured to add a memory value of one of the plurality of second previous-line addition memory sections that is located immediately behind itself and a multiplied value obtained after the multiplication processing executed by one of the plurality of second previous-line multiplying sections that corresponds to itself and to store an added value obtained by the addition processing; (c) at least one second current-line multiplying section which is virtually disposed in the line direction and each of which executes multiplication processing of an error value of a pixel located immediately behind the second target pixel and a corresponding one of weighting coefficients each being set in correspondence with each of the at least one error-utilizing pixel on the second current line, the number of the at least one second current-line multiplying section corresponding to a number of the at least one error-utilizing pixel on the second current line; and (d) at least one second current-line addition memory section each of which is provided so as to correspond to each of the at least one second current-line multiplying section and whose number corresponds to a number of the at least one error-utilizing pixel on the second current line, a rearmost one of the at least one second current-line addition memory section in the line direction being configured to store a multiplied value obtained after the multiplication processing executed by one of the at least one second current-line multiplying section that corresponds to itself while each of the rest of the at least one second current-line addition memory section being configured to add a memory value of one of the at least one second current-line addition memory section that is located immediately behind itself and a multiplied value obtained after the multiplication processing executed by one of the at least one second current-line multiplying section that corresponds to itself and to store an added value obtained by the addition processing, wherein the second average-error-value calculating portion is configured such that the processing of each of the plurality of second previous-line addition memory sections is sequentially executed in order from a forwardmost one of the plurality of second previous-line addition memory sections in the line direction and such that the processing of each of the at least one second current-line addition memory section is sequentially executed in order from a forwardmost one of the at least one second current-line addition memory section in the line direction, and wherein the second average-error-value calculating portion is configured to calculate, as the second average error value, a sum of a memory value of the forwardmost one of the plurality of second previous-line addition memory sections and the memory value of the forwardmost one of the at least one second current-line addition memory section.

7. The image processing apparatus according to claim 1, wherein a plurality of pixels which are set in the matrix of the pixels of the converted image in the vicinity of the first target pixel and whose error values are utilized for obtaining the converted pixel value of the first target pixel are defined as a plurality of first error-utilizing pixels, wherein the first unit-processing executing portion includes a first average-error-value calculating portion which calculates a first average error value that is an average error value of the plurality of first error-utilizing pixels, on the basis of an error value of each of a plurality of error-utilizing pixels on a first previous line which are set on the interpolate line in a previous line processing and which are at least a part of the plurality of first error-utilizing pixels, and wherein the first unit-processing executing portion is configured to correct the original pixel value of the first target pixel based on the first average error value calculated by the first average-error-value calculating portion and to obtain the converted pixel value of the first target pixel based on the pixel value obtained by the correction.

8. The image processing apparatus according to claim 7, wherein the first average-error-value calculating portion is configured to calculate the first average error value, utilizing an error value of a correlated pixel which is one pixel made as the second target pixel in one unit processing of a previous line processing and which is correlated with the first target pixel, as an error value of one pixel among the plurality of error-utilizing pixels on the first previous line.

9. The image processing apparatus according to claim 8, wherein the second unit-processing executing portion is configured to further obtain an error value of the second target pixel by the unit processing for the second target pixel, and wherein the image processing apparatus is arranged such that the error value of the second target pixel is outputted each time when the unit processing is executed by the second unit-processing executing portion and such that an error value of one pixel that is to become the correlated pixel is inputted each time when the unit processing is executed by the first unit-processing executing portion.

10. The image processing apparatus according to claim 8, wherein the plurality of error-utilizing pixels on the first previous line are set as a plurality of pixels which are continuous to each other, and
wherein the first unit-processing executing portion is configured to execute the unit processing for the first target pixel, utilizing the error value of the correlated pixel as an error value of a forwardmost error-utilizing pixel on the first previous line which is located forwardmost in the line direction among the plurality of error-utilizing pixels on the first previous line.

11. The image processing apparatus according to claim 10, wherein the first average-error-value calculating portion is configured to calculate the first average error value, further on the basis of an error value of each of at least one error-utilizing pixel on a first current line each of which is continuous to each other on the subject line behind the first target pixel in the line direction and which is a part of the plurality of first error-utilizing pixels,
wherein the first average-error-value calculating portion includes: (a) a plurality of first previous-line multiplying sections which are virtually disposed in the line direction and each of which executes multiplication processing of the error value of the forwardmost error-utilizing pixel on the first previous line and a corresponding one of weighting coefficients that are respectively set in correspondence with the plurality of error-utilizing pixels on the first previous line, the number of the plurality of first previous-line multiplying sections corresponding to a number of the plurality of error-utilizing pixels on the first previous line; (b) a plurality of first previous-line addition memory sections which are provided so as to respectively correspond to the plurality of the first previous-line multiplying sections and whose number corresponds to a number of the plurality of error-utilizing pixels on the first previous line, a rearmost one of the plurality of first previous-line addition memory sections in the line direction being configured to store a multiplied value obtained after the multiplication processing executed by one of the plurality of first previous-line multiplying sections that corresponds to itself while each of the rest of the plurality of first previous-line addition memory sections being configured to add a memory value of one of the plurality of first previous-line addition memory sections that is located immediately behind itself and a multiplied value obtained after the multiplication processing executed by one of the plurality of first previous-line multiplying sections that corresponds to itself and to store an added value obtained by the addition processing; (c) at least one first current-line multiplying section which is virtually disposed in the line direction and each of which executes multiplication processing of an error value of a pixel located immediately behind the first target pixel and a corresponding one of weighting coefficients each being set in correspondence with each of the at least one error-utilizing pixel on the first current line, the number of the at least one first current-line multiplying section corresponding to a number of the at least one error-utilizing pixel on the first current line; and (d) at least one first current-line addition memory section each of which is provided so as to correspond to each of the at least one first current-line multiplying section and whose number corresponds to a number of the at least one error-utilizing pixel on the first current line, a rearmost one of the at least one first current-line addition memory section in the line direction being configured to store a multiplied value obtained after the multiplication processing executed by one of the at least one first current-line multiplying section that corresponds to itself while each of the rest of the at least one first current-line addition memory section being configured to add a memory value of one of the at least one first current-line addition memory section that is located immediately behind itself and a multiplied value obtained after the multiplication processing executed by one of the at least one first current-line multiplying section that corresponds to itself and to store an added value obtained by the addition processing
wherein the first average-error-value calculating portion is configured such that the processing of each of the plurality of first previous-line addition memory sections is sequentially executed in order from a forwardmost one of the plurality of first previous-line addition memory sections in the line direction and such that the processing of each of the at least one first current-line addition memory section is sequentially executed in order from a forwardmost one of the at least one first current-line addition memory section in the line direction, and
wherein the first average-error-value calculating portion is configured to calculate, as the first average error value, a sum of a memory value of the forwardmost one of the plurality of first previous-line addition memory sections and the memory value of the forwardmost one of the at least one first current-line addition memory section.

12. The image processing apparatus according to claim 1, wherein a plurality of pixels which are set in the matrix of the pixels of the converted image in the vicinity of the first target pixel and whose error values are utilized for obtaining the converted pixel value of the first target pixel are defined as a plurality of first error-utilizing pixels while a plurality of pixels which are set in the matrix of the pixels of the converted image in the vicinity of the second target pixel and whose error values are utilized for obtaining the converted pixel value of the second target pixel are defined as a plurality of second error-utilizing pixels,
wherein the first unit-processing executing portion includes a first average-error-value calculating portion for calculating a first average error value which is an average error value of the plurality of first error-utilizing pixels,
wherein the second unit-processing executing portion includes a second average-error-value calculating portion for calculating a second average error value which is an average error value of the plurality of second error-utilizing pixels, and
wherein the image processing apparatus further comprises a single converted-pixel-value determining portion: which corrects the original pixel value of the first target pixel on the basis of the first average error value calculated by the first average-error-value calculating portion and determines the converted pixel value of the first target pixel on the basis of the pixel value obtained by the correction; and which corrects the pixel value of the second target pixel on the basis of the second average error value calculated by the second average-error-value calculating portion and determines the converted pixel value of the second target pixel on the basis of the pixel value obtained by the correction.

13. The image processing apparatus according to claim 1, wherein a plurality of pixels which are set in the matrix of the pixels of the converted image in the vicinity of the first target pixel and whose error values are utilized for obtaining the converted pixel value of the first target pixel are defined as a plurality of first error-utilizing pixels while a plurality of pixels which are set in the matrix of the pixels of the converted image in the vicinity of the second target pixel and whose error values are utilized for obtaining the converted pixel value of the second target pixel are defined as a plurality of second error-utilizing pixels, wherein the first unit-processing executing portion includes a first average-error-value calculating portion for calculating a first average error value which is an average error value of the plurality of first error-utilizing pixels, wherein the second unit-processing executing portion includes a second average-error-value calculating portion for calculating a second average error value which is an average error value of the plurality of second error-utilizing pixels, and wherein the image processing apparatus further comprises a single error-value calculating portion: which calculates the error value of the first target pixel on the basis of a pixel value obtained by correction of the original pixel value of the first target pixel based on the first average error value calculated by the first average-error-value calculating portion and the converted pixel value of the first target pixel obtained based on the pixel value obtained by the correction; and which calculates the error value of the second target pixel on the basis of a pixel value obtained by correction of the original pixel value of the second target pixel based on the second average error value calculated by the second average-error-value calculating portion and the converted pixel value of the second target pixel obtained based on the pixel value obtained by the correction.

14. An image processing apparatus used for converting image data of an original image composed of a plurality of pixels defined as a matrix into image data of a converted image, by a processing according to an error diffusion method, wherein a pixel value of each of the plurality of pixels that constitute the image data of the original image is defined as an original pixel value, a pixel value of each of the plurality of pixels that constitute the image data of the converted image is defined as a converted pixel value, and a processing for one pixel according to the error diffusion method is defined as a unit processing, the image processing apparatus comprising:

a unit-processing executing portion which executes the unit processing for a target pixel as one pixel existing on a subject line that is one of lines of the pixels in the matrix and which obtains the converted pixel value and the error value of the target pixel, based on the original pixel value of the target pixel, wherein the image processing apparatus is arranged to perform a line processing in which the unit processing by the unit-processing executing portion is repeated for the subject line while the target pixel is sequentially shifted forward in a line direction and the image processing apparatus is arranged such that the line processing is repeated while the subject line is sequentially shifted, whereby the image data of the original image is converted into the image data of the converted image, wherein a plurality of pixels which are set in the matrix in the vicinity of the target pixel and whose error values are utilized for obtaining the converted pixel value of the target pixel are defined as a plurality of error-utilizing pixels, wherein the unit-processing executing portion includes an average-error-value calculating portion which calculates an average error value of the plurality of error-utilizing pixels, on the basis of the error values of each of a plurality of error-utilizing pixels on a previous line which are continuous to each other on the subject line in a previous line processing and which are at least a part of the plurality of error-utilizing pixels, wherein the unit-processing executing portion is configured to correct the original pixel value of the target pixel based on the average error value calculated by the average-error-value calculating portion and to obtain the converted pixel value of the target pixel based on the pixel value obtained by the correction, wherein a pixel located forwardmost in the line direction among the plurality of error- utilizing pixels on the previous line is defined as a forwardmost error-utilizing pixel on the previous line, wherein the average-error-value calculating portion includes: a plurality of previous-line multiplying sections which are virtually disposed in the line direction and each of which executes multiplication processing of an error value of the forwardmost error-utilizing pixel on the previous line and a corresponding one of weighting coefficients that are respectively set in correspondence with the plurality of error-utilizing pixels on the previous line, a number of the plurality of previous-line multiplying sections corresponding to a number of the plurality of error-utilizing pixels on the previous line; and a plurality of previous-line addition memory sections which are provided so as to respectively correspond to the plurality of previous-line multiplying sections and whose number corresponds to a number of the plurality of error-utilizing pixels on the previous line, a rearmost one of the plurality of previous-line addition memory sections in the line direction being configured to store a multiplied value obtained after the multiplication processing executed by one of the plurality of multiplying sections that corresponds to itself while each of the rest of the plurality of previous-line addition memory sections being configured to add a memory value of one of the plurality of previous-line addition memory sections that is located immediately behind itself and a multiplied value obtained after the multiplication processing executed by one of the plurality of multiplying sections that corresponds to itself and to store an added value obtained by the addition processing, and wherein the average-error-value calculating portion is configured such that the processing of each of the plurality of previous-line addition memory sections is sequentially executed in order from a forwardmost one of the plurality of previous-line addition memory sections in the line direction and the average error value is calculated based on a memory value of the forwardmost one of the plurality of previous-line addition memory sections.

15. The image processing apparatus according to claim 14, wherein the average-error-value calculating portion is configured to calculate the average error value, further on the basis of an error value of each of at least one error-value utilizing pixel on a current line each of which is continuous to each other on the subject line behind the target pixel in the line direction and which is a part of the plurality of error-utilizing pixels, wherein the average-error-value calculating portion includes: at least one current-line multiplying section which is virtually disposed in the line direction and each of which executes multiplication processing of an error value of a pixel located immediately behind the target pixel and a corresponding one of weighting coefficients each being set in correspondence with each of the at least one error-utilizing pixel on the current line, a number of the at least one current-line multiplying section corresponding to a number of the at least one error-utilizing pixel on the current line; and at least one current-line addition memory section each of which is provided so as to correspond to each of the at least one current-line multiplying section and whose number corresponds to a number of the at least one error-utilizing pixel on the current line, a rearmost one of the at least one current-line addition memory section in the line direction being configured to store a multiplied value obtained after the multiplication processing executed by one of the at least one multiplying section that corresponds to itself while each of the rest of the at least one current-line addition memory section being configured to add a memory value of one of the at least one current-line addition memory section that is located immediately behind itself and a multiplied value obtained after the multiplication processing executed by one of the at least one multiplying section that corresponds to itself and to store an added value obtained by the addition processing, wherein the average-error-value calculating portion is configured such that the processing of each of the at least one current-line addition memory section is sequentially executed in order from a forwardmost one of the at least one current-line addition memory section in the line direction and such that the average error value is calculated based on a memory value of the forwardmost one of the at least one current-line addition memory section.

16. The image processing apparatus according to claim 15, wherein the average-error-value calculating portion is configured to calculate, as the average error value, a sum of the forwardmost one of the plurality of previous-line addition memory sections and the memory value of the forwardmost one of the at least one current-line addition memory section.

17. The image processing apparatus according to claim 14, wherein an error value of one pixel that is to become the forwardmost error-utilizing pixel on the previous line is inputted each time when the unit processing is executed by the unit-processing executing portion.

18. The image processing apparatus according to claim 17, wherein the error value of the target pixel is outputted each time when the unit processing is executed by the unit-processing executing portion.

* * * * *